US012730769B2

(12) United States Patent
Rossi et al.

(10) Patent No.: US 12,730,769 B2
(45) Date of Patent: Sep. 8, 2026

(54) RECONFIGURABLE, STREAMING-BASED CLUSTERS OF PROCESSING ELEMENTS, AND MULTI-MODAL USE THEREOF

(71) Applicant: STMicroelectronics International N.V., Geneva (CH)

(72) Inventors: Michele Rossi, Bareggio (IT); Giuseppe Desoli, San Fermo Della Battaglia (IT); Thomas Boesch, Rovio (CH)

(73) Assignee: STMicroelectronics International N.V., Geneva (CH)

( * ) Notice: Subject to any disclaimer, the term of this patent is extended or adjusted under 35 U.S.C. 154(b) by 194 days.

(21) Appl. No.: 18/192,631

(22) Filed: Mar. 29, 2023

(65) Prior Publication Data

US 2024/0281397 A1 Aug. 22, 2024

Related U.S. Application Data

(60) Provisional application No. 63/485,669, filed on Feb. 17, 2023.

(51) Int. Cl.
*G06F 13/40* (2006.01)
*G06F 13/16* (2006.01)

(52) U.S. Cl.
CPC ...... *G06F 13/4022* (2013.01); *G06F 13/1668* (2013.01)

(58) Field of Classification Search
None
See application file for complete search history.

(56) References Cited

U.S. PATENT DOCUMENTS 11,100,193 B2 8/2021 Gu et al.
11,263,077 B1 3/2022 Seznayov et al.
(Continued)

OTHER PUBLICATIONS

Chi et al., "PRIME: A Novel Processing-in-memory Architecture for Neural Network Computation in ReRAM-based Main Memory," 2016 ACM/IEEE 43rd Annual International Symposium on Computer Architecture, pp. 27-39.
(Continued)

*Primary Examiner* — Farley Abad
*Assistant Examiner* — Dayton Lewis-Taylor
(74) *Attorney, Agent, or Firm* — Seed IP Law Group LLP

(57) ABSTRACT

A hardware accelerator includes processing elements of a neural network, each processing element having a memory; a stream switch; stream engines coupled to functional circuits via the stream switch, wherein the stream engines, in operation, generate data streaming requests to stream data to and from functional circuits of the plurality of functional circuits; a first system bus interface coupled to the stream engines; a second system bus interface coupled to the processing elements; and mode control circuitry, which, in operation, sets respective modes of operation for the plurality of processing elements. The modes of operation include: a compute mode of operation in which the processing element performs computing operations using the memory associated with the processing element; and a memory mode of operation in which the memory associated with the processing element performs memory operations, bypassing the stream switch, via the second system bus interface.

30 Claims, 34 Drawing Sheets

(56) References Cited

U.S. PATENT DOCUMENTS

| | | | | |
|---|---|---|---|---|
| 11,323,391 | B1 | 5/2022 | McColgan et al. | |
| 11,562,115 | B2 | 1/2023 | Boesch et al. | |
| 2008/0007928 | A1* | 1/2008 | Salama | H05K 1/029<br>361/784 |
| 2018/0189229 | A1 | 7/2018 | Desoli et al. | |
| 2018/0189641 | A1 | 7/2018 | Boesch et al. | |
| 2018/0189642 | A1 | 7/2018 | Boesch et al. | |
| 2018/0218275 | A1 | 8/2018 | Arrigoni et al. | |
| 2018/0341495 | A1* | 11/2018 | Culurciello | G06N 3/063 |
| 2019/0266479 | A1* | 8/2019 | Singh | G06N 3/0464 |
| 2020/0272779 | A1 | 8/2020 | Boesch et al. | |
| 2020/0294575 | A1 | 9/2020 | O et al. | |
| 2021/0073450 | A1 | 3/2021 | Boesch et al. | |
| 2021/0150318 | A1 | 5/2021 | Kwak | |
| 2021/0402898 | A1* | 12/2021 | Alvarez | B60N 2/501 |
| 2022/0101086 | A1 | 3/2022 | Cappetta et al. | |
| 2022/0107911 | A1 | 4/2022 | Fleming et al. | |
| 2022/0156566 | A1 | 5/2022 | Jeon et al. | |
| 2022/0318610 | A1 | 10/2022 | Seo et al. | |
| 2022/0343144 | A1 | 10/2022 | Liang et al. | |
| 2024/0281646 | A1 | 8/2024 | Rossi et al. | |

OTHER PUBLICATIONS

Huawei Technologies Co., Ltd., "CANN 3.3.0—Software Installation Guide (ascend-deployer)," Issue 01, Aug. 4, 2021, 166 pages.

U.S. Appl. No. 18/192,629, filed Mar. 29, 2023.

* cited by examiner

Digit Recognition

7→7 5→5

8→8 3→3

2→2 4→4

Output

| 0.5 | 0 | 0.25 | 0.25 |
|---|---|---|---|
| 0 | 1.25 | 0.5 | 0.5 |
| 0 | 0.5 | 0.75 | 1.5 |
| 0.5 | 0.25 | 1.25 | 1 |

outDim=(inpDim)/strideDim $$\underset{[5\times 27]}{\begin{pmatrix} k_{1,1} & k_{2,1} & \cdots & k_{i,1} \\ k_{1,2} & k_{2,2} & \cdots & k_{i,2} \\ \vdots & \vdots & \vdots & \vdots \\ k_{1,j} & k_{2,j} & \cdots & k_{i,j} \end{pmatrix}} \underset{[27\times 1]}{\begin{pmatrix} f_1 \\ f_2 \\ \vdots \\ f_i \end{pmatrix}} = \underset{[5\times 1]}{\begin{pmatrix} O_1 \\ O_2 \\ \vdots \\ O_j \end{pmatrix}}$$

Matrix−Vector Multiplication (MVM)

Figure 14:
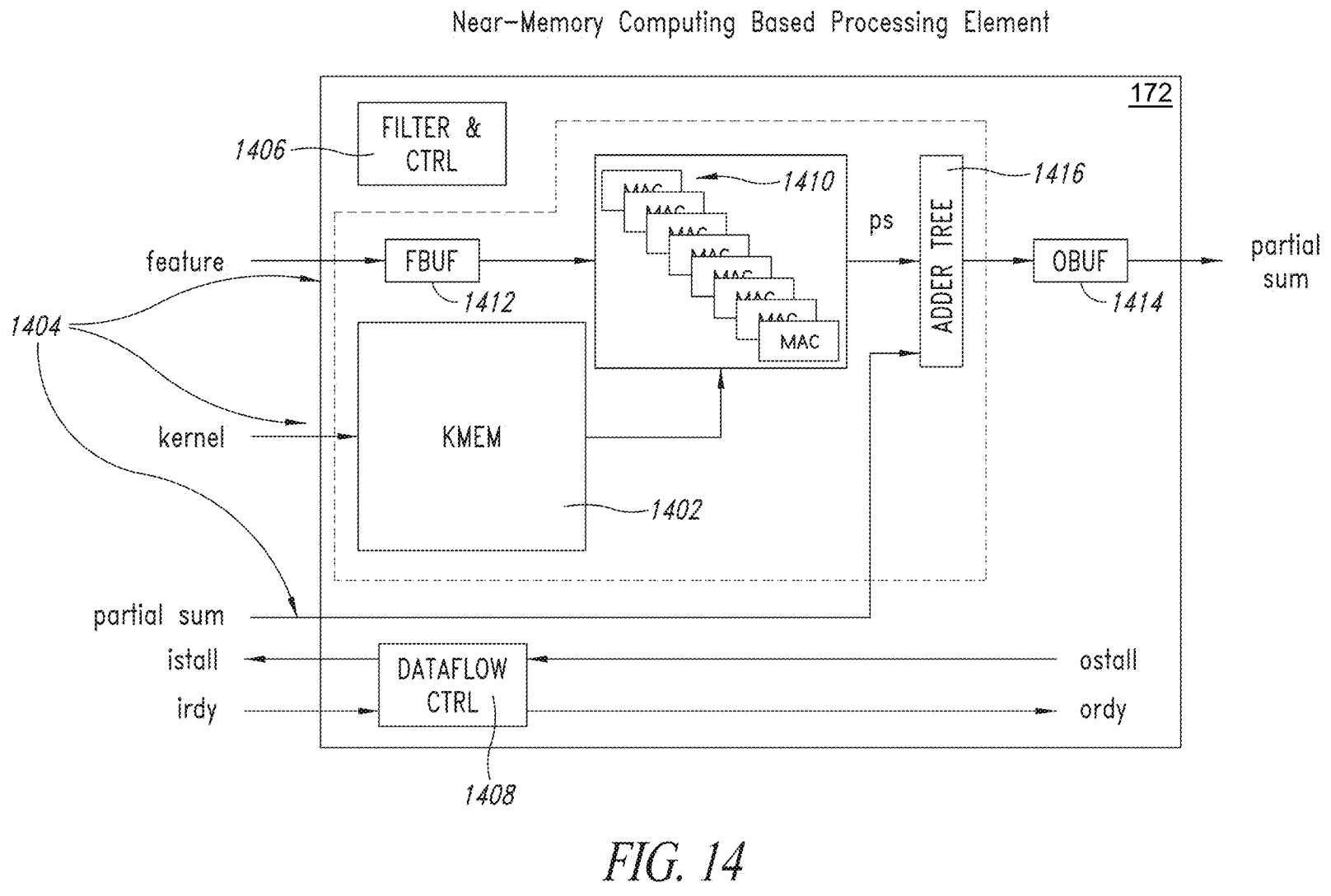

Near-Memory Computing Based Processing Element

172

FILTER & CTRL

1406

FBUF

1412

KMEM

1402

MAC

1410 ps

ADDER TREE

1416

OBUF

1414 partial sum

DATAFLOW CTRL

1408 ostall ordy feature kernel partial sum istall irdy

Figure 15:
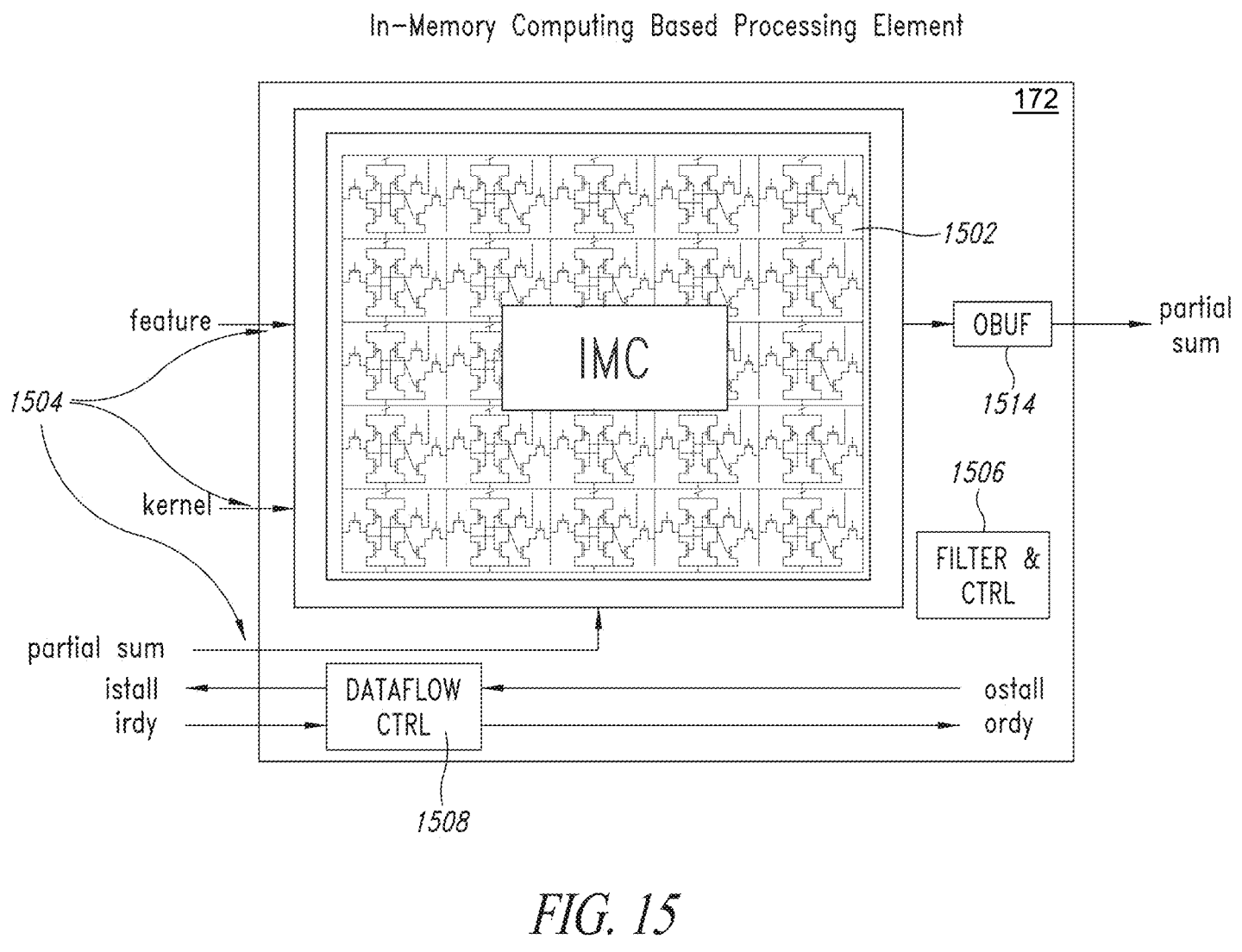

In-Memory Computing Based Processing Element

172

1502

IMC

OBUF

1514 partial sum

1506

FILTER & CTRL ostall ordy

DATAFLOW CTRL

1508 feature kernel partial sum istall irdy

1504

FIG. 15 kernel 1x1:
- no data reuse between lines
- line buffer not required
- all PEs in compute mode kernel 1xN:
- some data reuse in the same lines
- small line buffer required
- 1 PE in memory mode Line Control Memory Network

PE PE PE PE PE PE PE PE

Filter

Broadcast Network feat

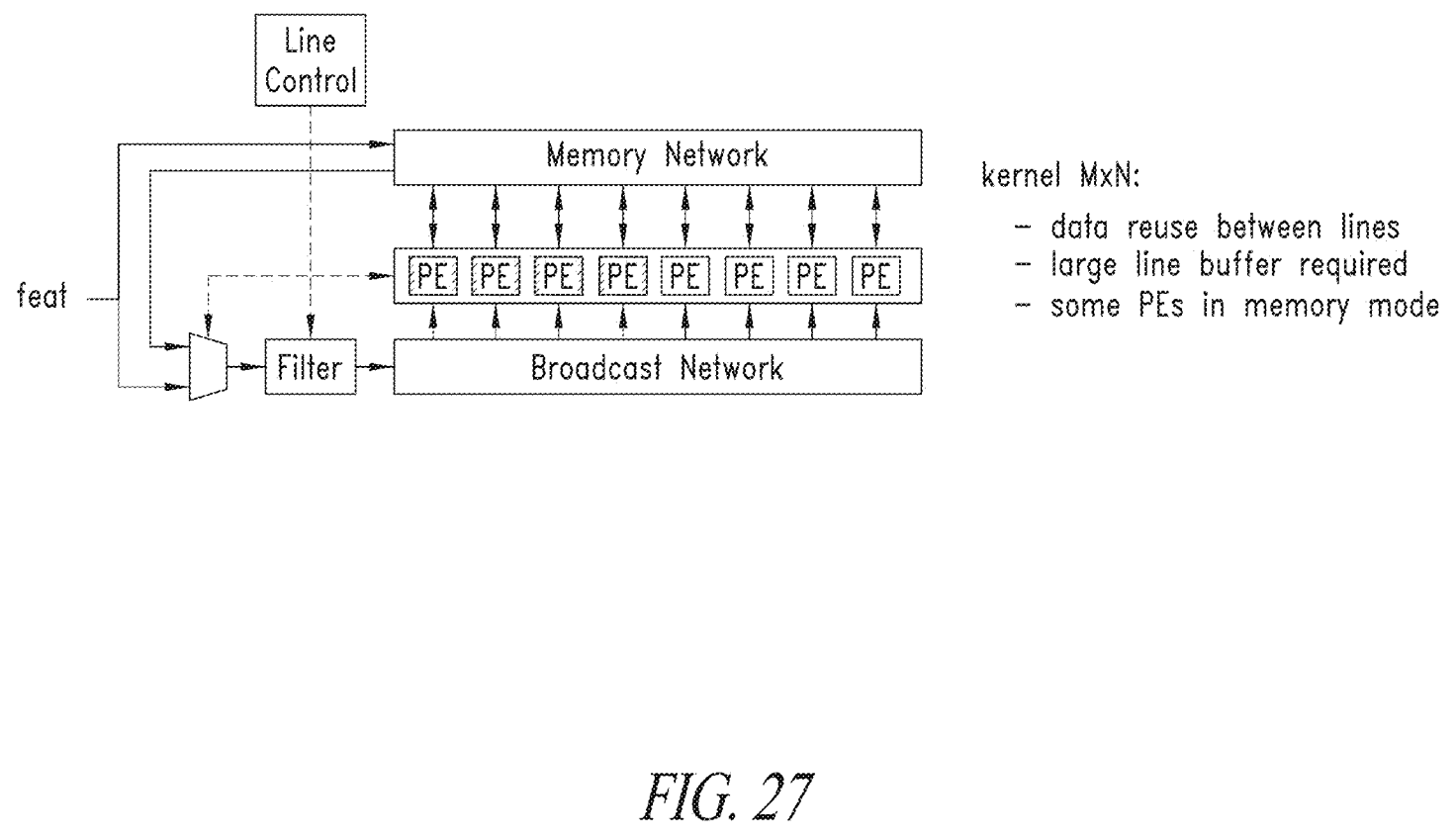

FIG. 26 kernel MxN:
- data reuse between lines
- large line buffer required
- some PEs in memory mode Memory Network

PE PE PE PE PE PE PE PE

Broadcast Network

Line Control

Filter feat

FIG. 27

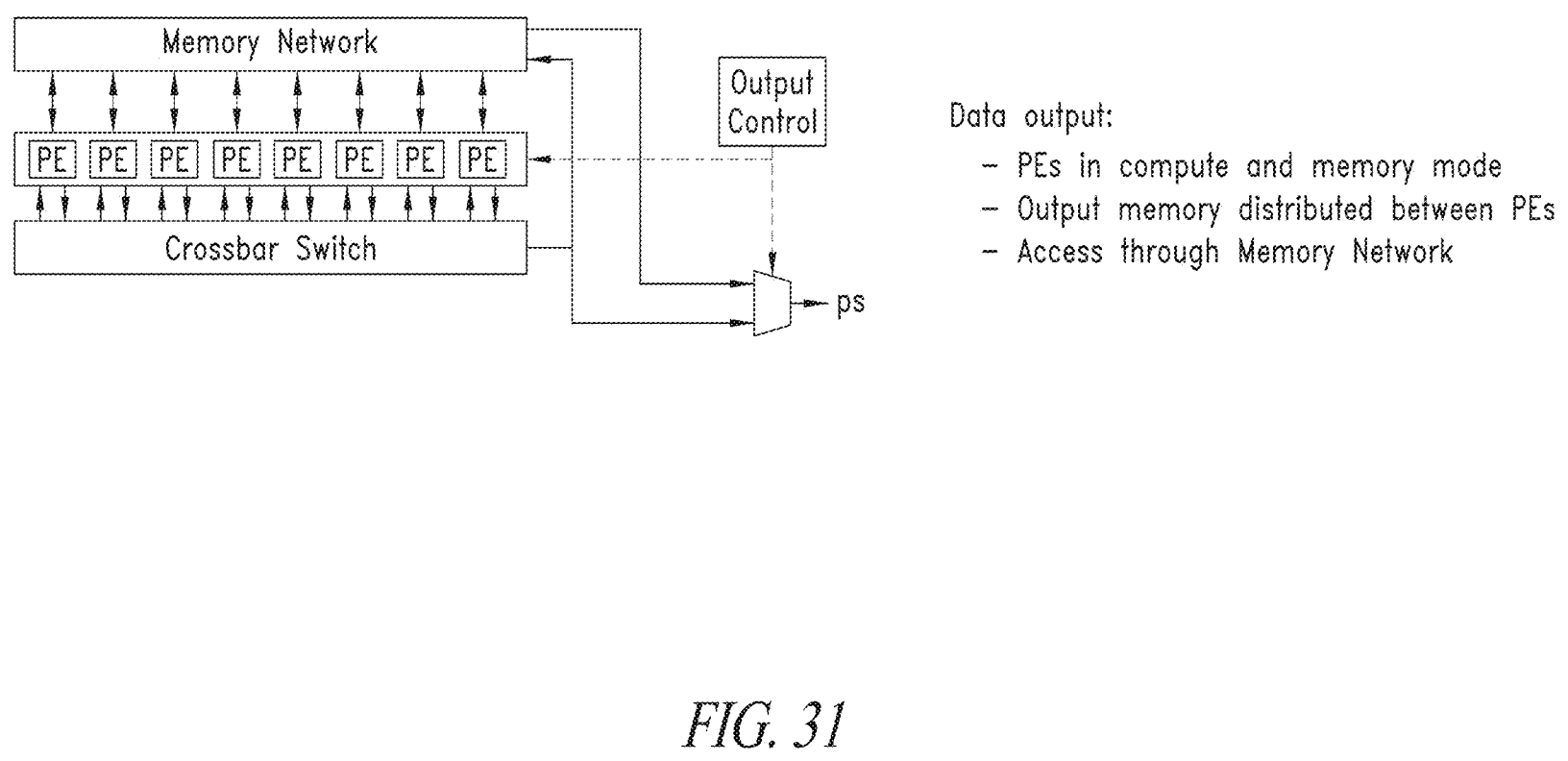

Data output:
- PEs in compute and memory mode
- Output memory distributed between PEs
- Access through Memory Network Memory Network

PE PE PE PE PE PE PE PE

Crossbar Switch

Output Control ps

FIG. 31

RECONFIGURABLE, STREAMING-BASED CLUSTERS OF PROCESSING ELEMENTS, AND MULTI-MODAL USE THEREOF

BACKGROUND

Technical Field

The present disclosure generally relates to convolutional accelerators, such as convolutional accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Hardware accelerators including convolutional accelerators are often employed to accelerate the processing of large amounts of data by a DCNN.

BRIEF SUMMARY

In some embodiments, a hardware accelerator includes a plurality of functional circuits; a stream switch; and a plurality of stream engines coupled to the plurality of functional circuits via the stream switch. The plurality of stream engines, in operation, generate data streaming requests to stream data to and from functional circuits of the plurality of functional circuits. The plurality of functional circuits includes at least one convolutional cluster, the convolutional cluster including a plurality of processing elements coupled together via a reconfigurable crossbar switch. The reconfigurable crossbar switch is coupled to the stream switch, and the reconfiguration crossbar switch, in operation, streams data to processing elements of the cluster from the stream switch, from processing elements of the cluster to the stream switch, and between processing elements of the cluster.

In some embodiments, a system includes a host device; and a hardware accelerator. The hardware accelerator includes a plurality of functional circuits; a stream switch; and a plurality of stream engines coupled to the plurality of functional circuits via the stream switch. The plurality of stream engines, in operation, generate data streaming requests to stream data to and from functional circuits of the plurality of functional circuits. The plurality of functional circuits includes at least one convolutional cluster, the convolutional cluster including a plurality of processing elements coupled together via a reconfigurable crossbar switch. The reconfigurable crossbar switch is coupled to the stream switch, and the reconfiguration crossbar switch, in operation, streams data to processing elements from the stream switch, from processing elements to the stream switch, and between processing elements of the processing cluster.

In some embodiments, a method includes streaming data between stream engines of a plurality of stream engines of a hardware accelerator and functional circuits of a plurality of functional circuits of the hardware accelerator via a stream switch, wherein the plurality of functional circuits includes at least one convolutional cluster and the convolutional cluster includes a plurality of processing elements interconnected via a reconfigurable crossbar switch, and wherein the reconfigurable crossbar switch is coupled to the stream switch; and performing, using a processing element of the plurality of processing elements, a computing operation using at least a part of the data streamed from at least one of the stream engines; and streaming data to, from, and between processing elements of the processing cluster via the reconfigurable crossbar switch.

In some embodiments, a non-transitory computer-readable medium has contents which configure a stream switch to stream data between stream engines of a plurality of stream engines of a hardware accelerator and functional circuits of a plurality of functional circuits of the hardware accelerator, wherein the plurality of functional circuits includes at least one convolutional cluster and the convolutional cluster includes a plurality of processing elements interconnected via a reconfigurable crossbar switch, and wherein the reconfigurable crossbar switch is coupled to the stream switch; configure a processing element of the plurality of processing elements to perform a computing operation using at least a part of the data streamed from at least one of the stream engines; and configure the reconfigurable crossbar switch to stream data to, from, and between processing elements of the processing cluster.

In some embodiments, a hardware accelerator includes a plurality of processing elements, each processing element having memory associated with the processing element; a stream switch; a plurality of stream engines coupled to a plurality of functional circuits via the stream switch, wherein the plurality of stream engines, in operation, generate data streaming requests to stream data to and from functional circuits of the plurality of functional circuits; a first system bus interface coupled to the plurality of stream engines; a second system bus interface coupled to the plurality of processing elements; and mode control circuitry, which, in operation, sets respective modes of operation for the plurality of processing elements. The modes of operation include a compute mode of operation in which the processing element performs computing operations using the memory associated with the processing element; and a memory mode of operation in which the memory associated with the processing element performs memory operations, bypassing the stream switch, via the second system bus interface.

In some embodiments, a system includes a host device; and a hardware accelerator. The hardware accelerator includes a plurality of processing elements, each processing element having memory associated with the processing element; a stream switch; a plurality of stream engines coupled to a plurality of functional circuits via the stream switch, wherein the plurality of stream engines, in operation, generate data streaming requests to stream data to and from functional circuits of the plurality of functional circuits; a first system bus interface coupled to the plurality of stream engines; a second system bus interface coupled to the plurality of processing elements; and mode control circuitry, which, in operation, sets respective modes of operation for the plurality of processing elements. The modes of operation include a compute mode of operation in which the processing element performs computing operations using the memory associated with the processing element; and a memory mode of operation in which the memory associated with the processing element performs memory operations, bypassing the stream switch, via the second system bus interface.

In some embodiments, a method includes streaming data between stream engines of a plurality of stream engines of a hardware accelerator and functional circuits of a plurality of functional circuits of the hardware accelerator via a stream switch, wherein the plurality of functional circuits includes at least one cluster including a plurality of processing elements; and setting respective modes of operation for the plurality of processing elements. The modes of operation include a compute mode of operation in which the processing element performs computing operations using memory associated with the processing element; and a memory mode of operation in which the memory associated with the processing element performs memory operations, bypassing the stream switch.

In some embodiments, a non-transitory computer-readable medium has contents which configure a stream switch to stream data between stream engines of a plurality of stream engines of a hardware accelerator and functional circuits of a plurality of functional circuits of the hardware accelerator, wherein the plurality of functional circuits includes at least one cluster including a plurality of processing elements; and set respective modes of operation for the plurality of processing elements. The modes of operation include a compute mode of operation in which the processing element performs computing operations using memory associated with the processing element; and a memory mode of operation in which the memory associated with the processing element performs memory operations, bypassing the stream switch.

BRIEF DESCRIPTION OF THE SEVERAL VIEWS OF THE DRAWINGS

One or more embodiments are described hereinafter with reference to the accompanying drawings.

FIG. 14 is a conceptual diagram illustrating an implementation of a processing element based on Near-Memory Computing.

FIG. 15 is a conceptual diagram illustrating an implementation of a processing element based on In-Memory Computing.

FIGS. 25-27 are conceptual diagrams illustrating processing elements' mode of operation and memory network configuration based on different kernels.

FIG. 31 is a conceptual diagram illustrating output memory distributed between PEs in accordance with their modes of operation and accessible through a memory network.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "of" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figures 1, 2:
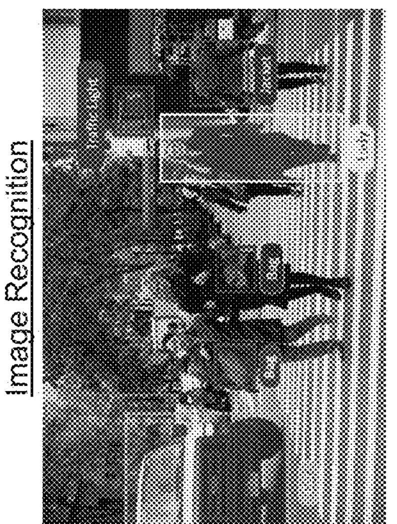
FIG. 1 is a conceptual diagram illustrating a digit recognition task.
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
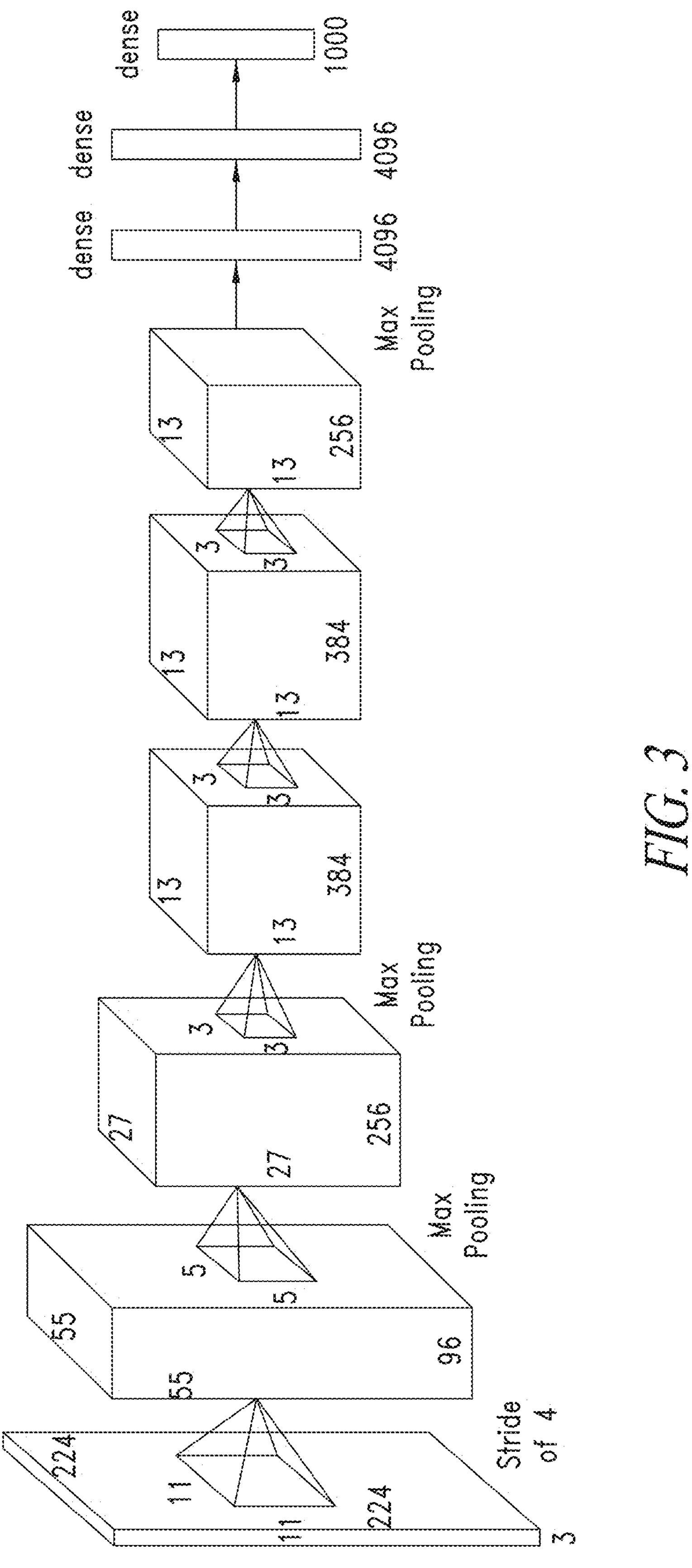
FIG. 3 is a conceptual diagram illustrating an example of a CNN.

CNNs are specific types of deep neural networks (DNN) with one or multiple layers which perform a convolution on a multi-dimensional feature data tensor (e.g., a three-dimensional data tensor having width×height×depth). The first layer is an input layer and the last layer is an output layer. The intermediate layers may be referred to as hidden layers. The most used layers are convolutional layers, fully connected or dense layers, and pooling layers (max pooling, average pooling, etc.). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
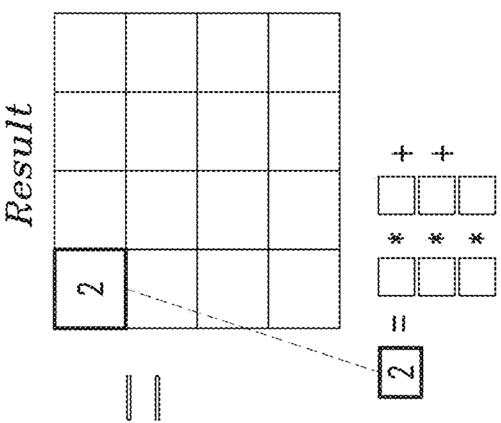
FIG. 4 is a conceptual diagram illustrating an example application of a kernel to a feature map.
Figure 4:
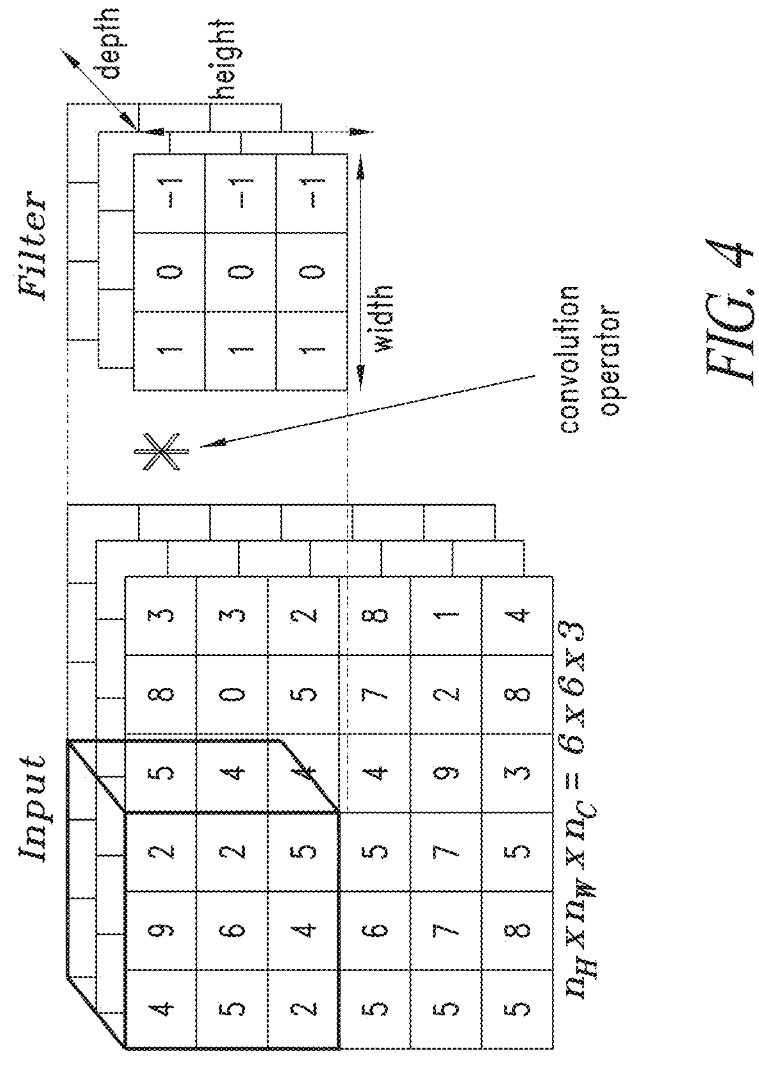

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating an example application of a kernel to a feature map, producing a two-dimensional feature map having a height of 4 and a width of 4.

Figure 5:
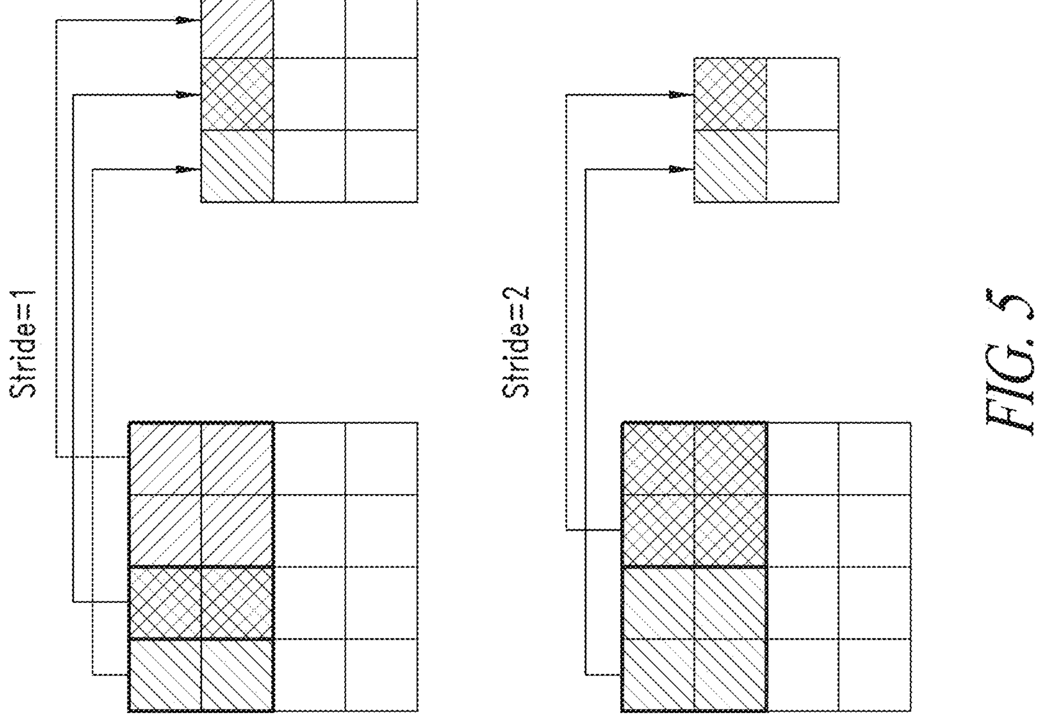
FIG. 5 is a conceptual diagram comparing a stride of 1 and a stride of 2.
Figure 6:
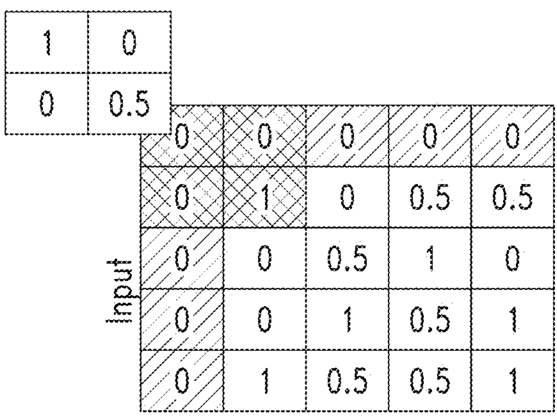
FIG. 6 is a conceptual diagram illustrating application of padding to an input feature map.

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters. The stride hyper-parameter indicates a step-size used to slide kernels across an input feature map. FIG. 5 is a conceptual diagram comparing a stride of 1 and a stride of 2. The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map.

Figure 7:
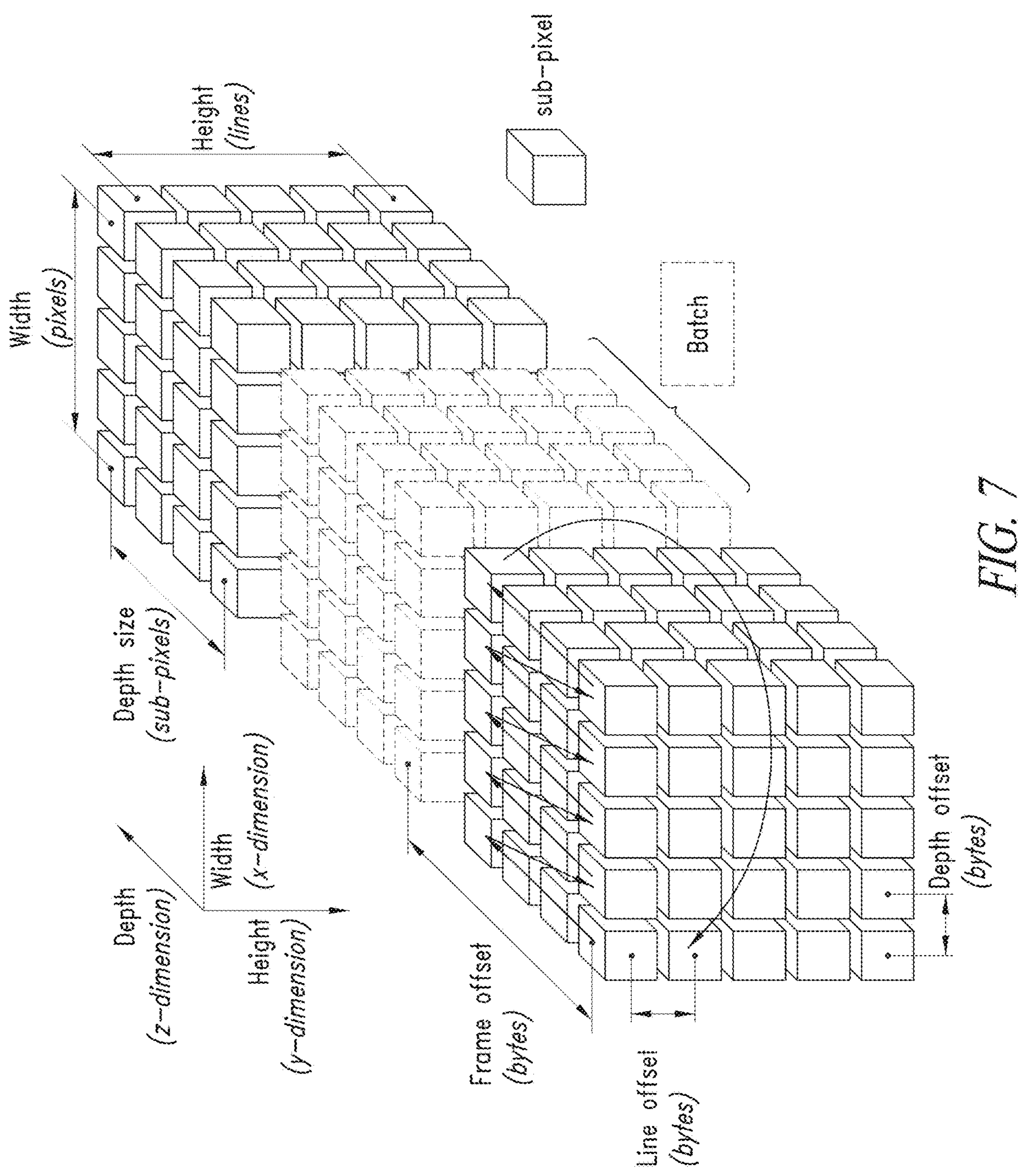
FIG. 7 is a conceptual diagram illustrating the concept of loading feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
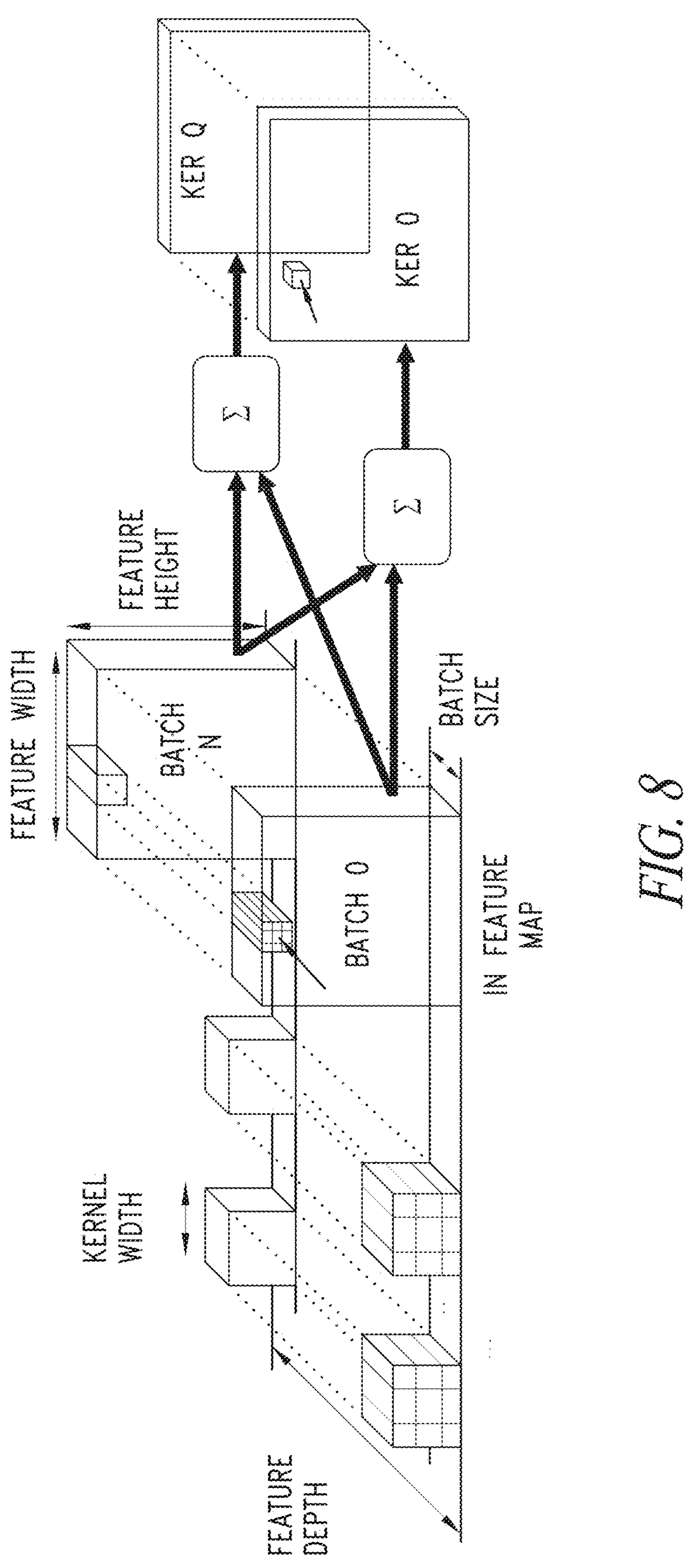
FIG. 8 is a conceptual diagram illustrating the concept of batch processing of a convolution.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

As can be seen, the computations performed by a CNN, or by other neural networks, often include repetitive computations over large amounts of data. For this reason, computing systems having hardware accelerators may be employed to increase the efficiency of performing operations associated with the CNN.

Figure 9A:
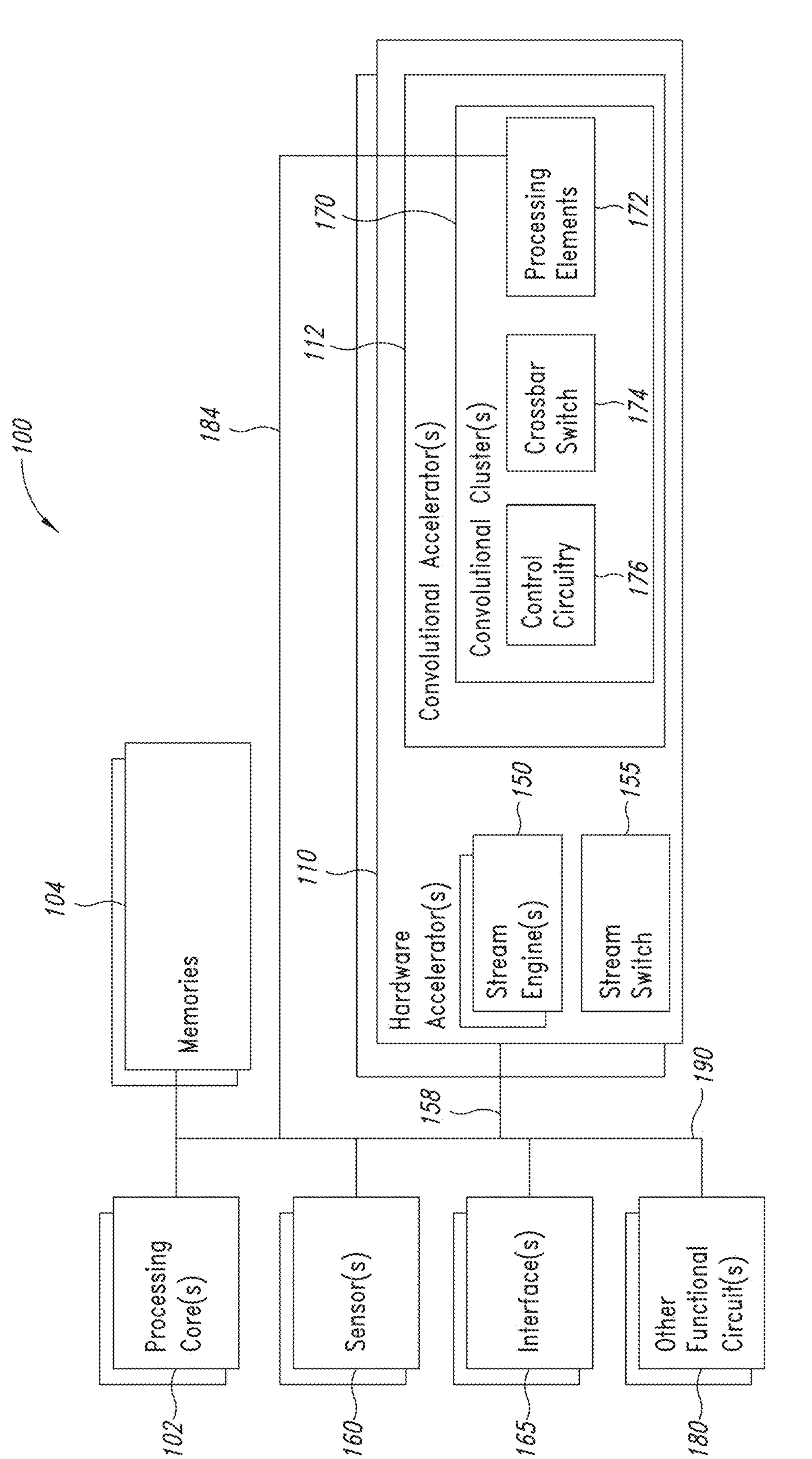
FIGS. 9A-9C are functional block diagrams of an electronic device or system in accordance with some embodiments of the presently disclosed technology.

FIG. 9A is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, which, in operation, may be shared by one or more processes executed by the system 100.

The system 100 may include one or more sensors 160 (e.g., image sensors, audio sensors, accelerometers, pressure sensors, temperature sensors, etc.), one or more interfaces 165 (e.g., wireless communication interfaces, wired communication interfaces, etc.), and other circuits 180, which may include antennas, power supplies, one or more built-in self-test (BIST) circuits, etc., and a main bus system 190. The main bus system 190 may include one or more data, address, power and/or control buses coupled to the various components of the system 100.

The system 100 also includes one or more hardware accelerators 110 which, in operation, accelerate the performance of one or more operations associated with implementing a CNN. The hardware accelerator 110 as illustrated includes one or more convolutional accelerators 112 to facilitate efficient performance of convolutions associated with convolutional layers of a CNN. A convolutional accelerator 112 can include one or more convolution clusters 170. As illustrated, the convolutional clusters 170 include control circuitry 176, a crossbar switch 174, and processing elements (PEs) 172. The crossbar switch 174, in operation, can be configured to chain or otherwise interconnect the PEs in various ways, e.g., to perform convolution operations in accordance with a particular CNN layer, using corresponding kernel and feature data. The hardware accelerator 110 as illustrated also includes one or more stream engines 150 and a stream switch 155. The stream engines 150, in operation, transmit data streams. For example, the stream engines 150 may stream data, such as feature data or kernel data stored in memory 104, to a convolutional accelerator 112 via the stream switch 155. In some embodiments, a convolutional accelerator 112 can be implemented in other ways and communicate with one or more convolution clusters 170 to perform CNN operations.

In some embodiments, a bus interface 184 coupled to one or more of the PEs 172 provides direct access to the PE's memories to the host controller, which may leverage PEs that are unused (e.g., not in computing mode) as additional random-access memory (RAM). In some embodiments, the bus interface 184 coupled to one or more of the PEs 172 bypasses the stream switch 155. In these embodiments, there are two paths from the main bus system 190 to the PEs: one system bus interface 158 that further goes through the stream switch 155 via the stream engines 150, and another one via interface 184 that directly accesses the PEs.

In some embodiments, the stream switch 155 uses a protocol that is shared between all components or circuitry connected to the stream switch 155; the crossbar switch 174 uses its own protocol (e.g., based on data, ready and stall signals) that can be different from the stream switch protocol.

In some embodiments, the stream switch 155 has a stream link data width that is chosen based on system architecture considerations; the crossbar switch's data width can be different from the stream switch's data width, because the crossbar switch's data width is related to the width of the accumulation port of PEs 172. For example, the stream switch can use a 128 bit stream link, while the crossbar switch can use a 24 bit crossbar switch link.

In some embodiments, the crossbar switch 174 may not be directly coupled with the stream link interface of the stream switch 155. For example, some preprocessing stages can be implemented to adapt the bandwidth between the stream switch and the crossbar switch.

Figure 9B:
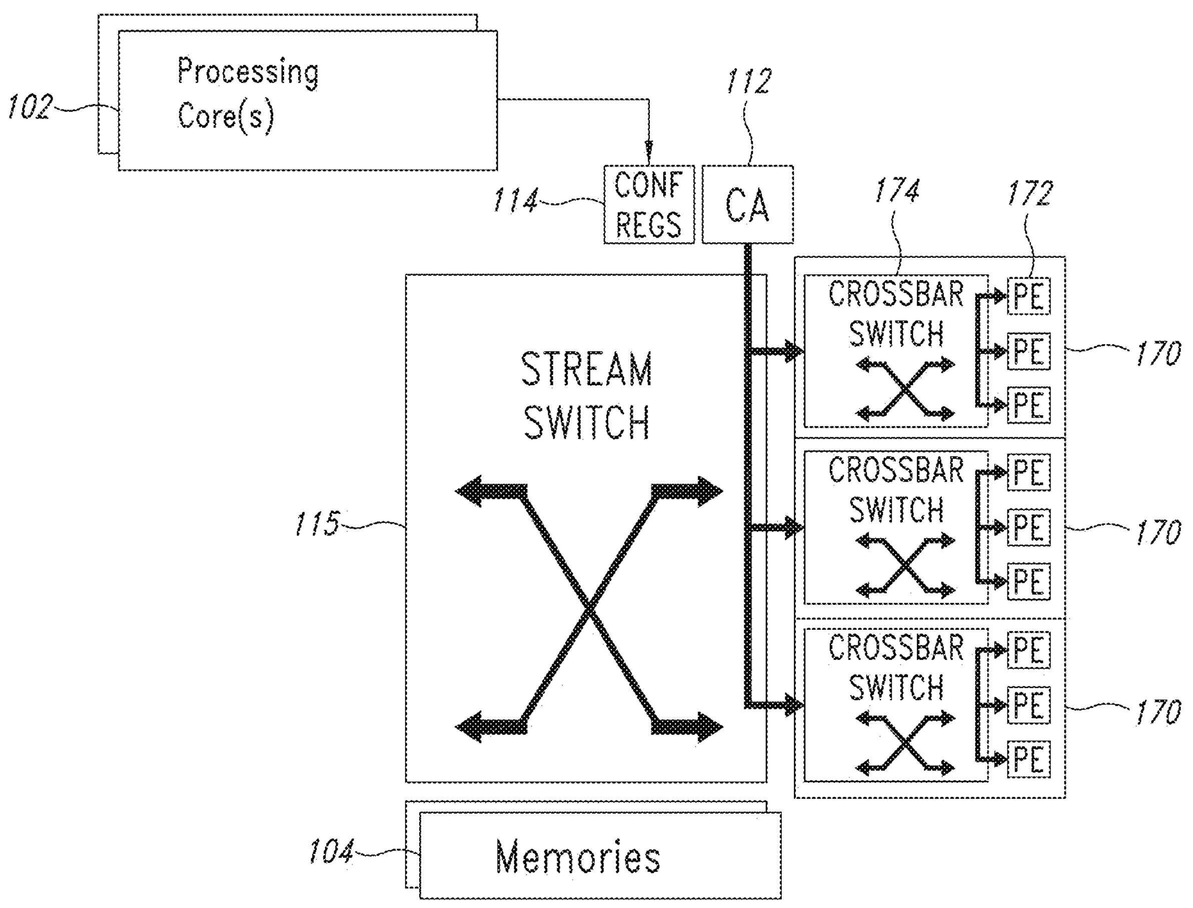

FIG. 9B illustrates an example relationship between stream switch and crossbar switches, in accordance with some embodiments. As shown, processing core(s) 102 can configure configuration registers 114 associated with one or more convolutional accelerators 112 and one or more convolutional clusters 170. In some embodiments, at least a subset of convolutional accelerators 112 coupled to the stream switch 115 does not include a convolutional cluster 170 as a subcomponent, or is implemented in a different manner than a convolutional cluster 170. Multiple convolutional clusters 170, which may or may not be part of or subject to control of the convolutional accelerator(s) 112, can be chained through the stream switch 115. In some embodiments, both convolutional cluster(s) 170 and convolutional accelerator(s) 112 (e.g., that are designed differently than the convolutional cluster 170) can be chained through the stream switch 115.

Illustratively, each of the convolutional clusters have multiple PEs 172 (e.g., performing MVMs) that can be chained through a crossbar switch 174. Additionally, multiple convolutional accelerators 112 (not shown) can be connected to the stream switch 115, and thereby connecting to their corresponding convolutional cluster(s) 170.

In the example shown in FIG. 9B, the convolutional accelerator 112 corresponds to an orchestrator of multiple convolutional clusters 170 connected to a local stream switch. This way the traffic of partial sums of convolutional layers can be confined locally within the control of the convolutional accelerator 112, but the system is also flexible to allow the partial sums traffic to flow through the stream switch. This means the system is autosimilar, i.e., similar features are used at different levels of the hierarchy (e.g., at least between the level of crossbar switch and stream switch).

Figure 9C:
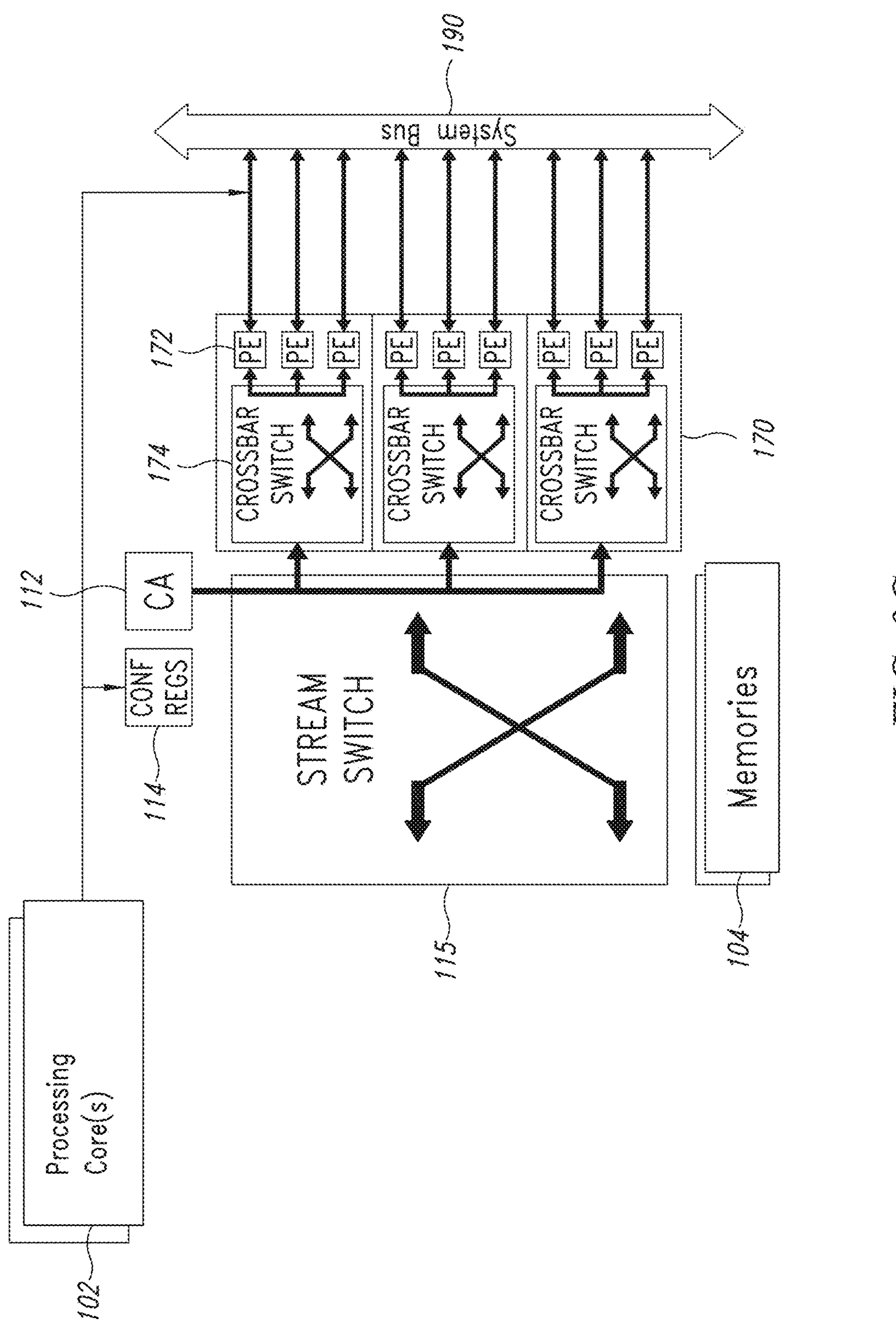

FIG. 9C further illustrates an example relationship between the memory of PEs 172, the main system bus 190, and processing core(s) 102. As shown, in some embodiments, the memory of PEs are accessible to the main system bus 190, bypassing the stream switch 115 and crossbar switch 174. In some embodiments, the memory of PEs are accessible to the processing core(s) 102, e.g., via the main system bus 190 or via another access interface different from the main system bus 190.

In accordance with some implementations, a convolution includes a series of products of a 3D tensor kernel that is applied recursively on a 3D tensor feature. These products are then accumulated to obtain an element of a 3D output feature map. To obtain the next element of the output, the kernel is shifted along the feature data and the same accumulation of products is performed.

The feature volume underlying the kernel is referred to as a patch of the feature. 3D shapes have 3 dimensions: a width, a height, and a depth (also known as the number of channels). Typically, the number of channels of the kernel and the number of channels of the feature are the same. Typically, the elements along the depth are joined together and referred to as a pixel of the 3D tensor, which in turn can be seen as a 2D shape with each element being a pixel.

Figure 10:
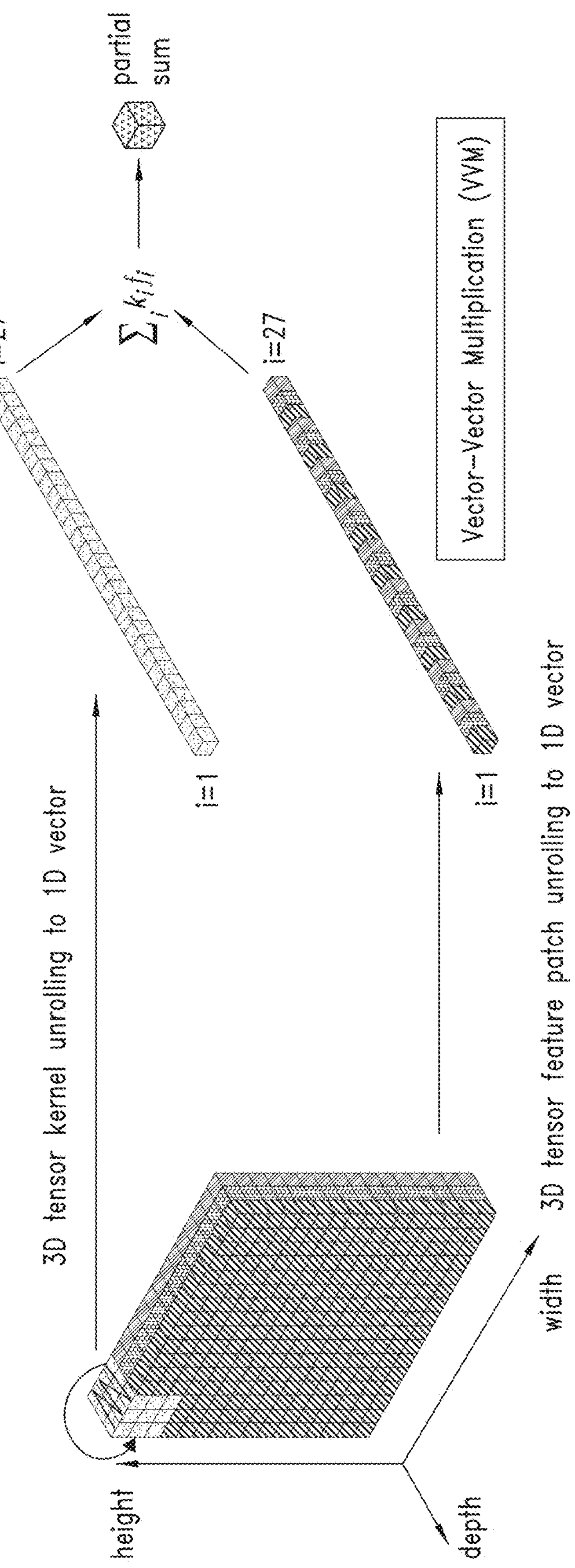
FIG. 10 is a conceptual diagram illustrating 3D tensor unrolling and a vector-vector multiplication.

The basic accumulation operation can be performed as a vector-vector multiplication (VVM), if a linear transformation is applied to both the kernel and the underlying feature patch to unroll them into a 1D array. This linear transformation includes taking one element at a time following a certain path, e.g., moving along the depth first, then the width, and once the row is finished, jump to the next one. This transformation is performed the same way for both the kernel and the feature patch to facilitate the coherence of data. FIG. 10 is a conceptual diagram illustrating 3D tensor unrolling and a VVM.

Figure 11:
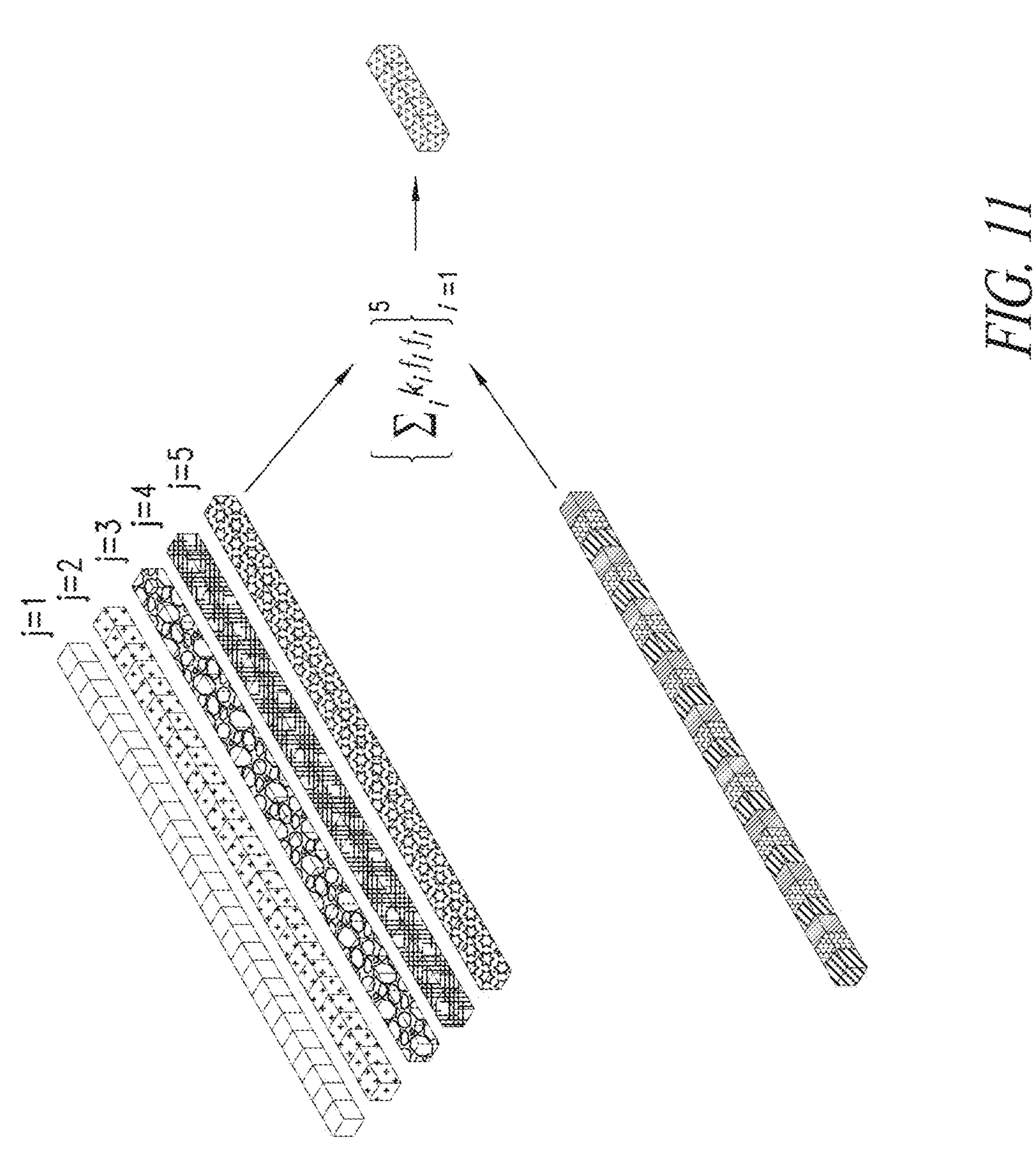
FIG. 11 is a conceptual diagram illustrating a matrix-vector multiplication.

To obtain an entire pixel of the output feature map, VVM is repeated on the same feature patch using a respective kernel for each of the channels of the output pixel. Accordingly, the number of kernels and number of output channels are generally interchangeable. With the multiple different kernels, a matrix-vector multiplication (MVM) is performed to obtain a single pixel of the output feature map. To obtain all the pixels of the output, recursive application of the same kernels on different patches of the feature is performed. FIG. 11 is a conceptual diagram illustrating a MVM.

Figure 12:
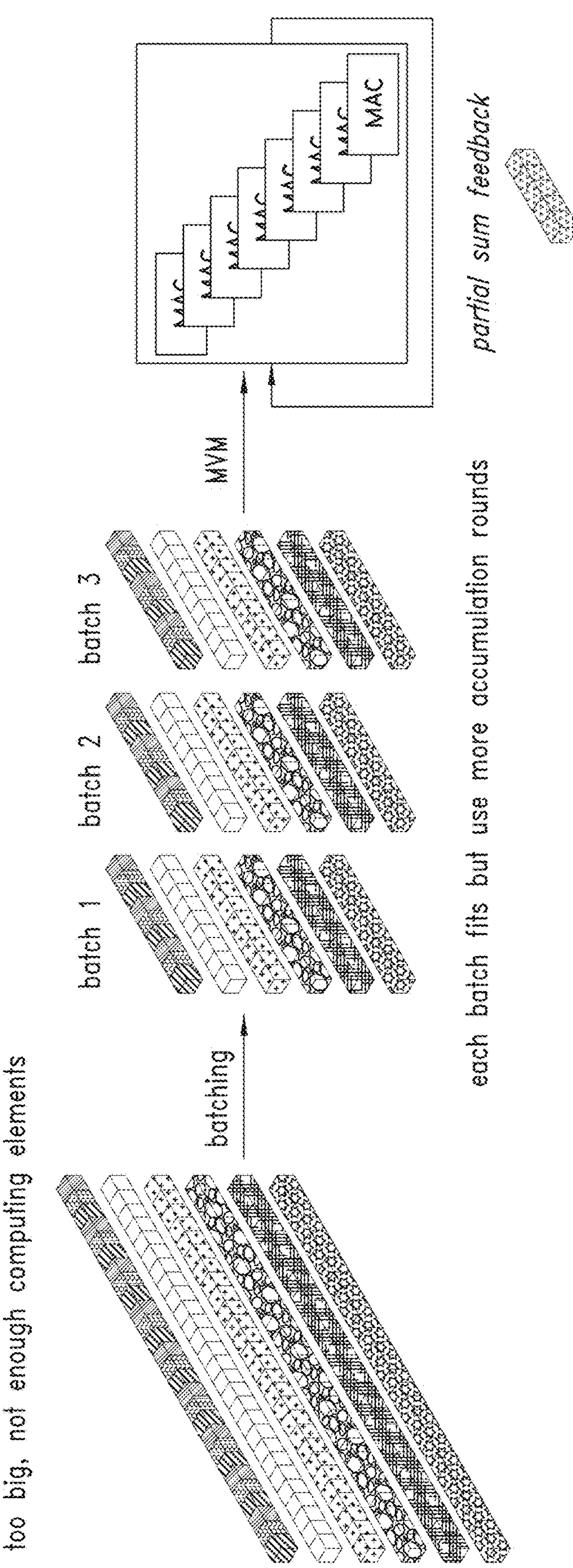
FIG. 12 is a conceptual diagram illustrating batching of feature and kernel data.

In many cases, CNNs are run on constrained hardware. If the constraints do not allow for mapping of the entire feature or kernel, the feature and kernel are split accordingly in batches to fit, e.g., a constraint on the maximum number of multiply-accumulate (MAC) operations that can be performed in hardware. The intermediate results of each batch (referred to as "partial sums") are stored and accumulated with those of previous batches to obtain the pixel of the output feature map. FIG. 12 is a conceptual diagram illustrating batching of feature and kernel data.

At least partly due to the differences among different layers of a CNN, performing inference of a full CNN model on resource-constrained platforms, targeting a throughput sufficient for use, in most cases, with real-time applications, is a compute-intensive task. Generally, a CNN's architecture is shaped as a funnel. As an example, for image recognition applications, the first layers receive as input images that are large along the width and the height, but use only 3 channels, e.g., red, green, and blue values of a pixel. Subsequent layers have reduced width and height dimensions but grow deeper in the number of channels.

Therefore, the first layer, the last layer, and those in between can have very different constraints to deal with. For example, the first layer may have larger memory requirements to store the entire image with reduced compute capabilities since only 3 channels need to be managed, while the last layer may require massive compute capabilities due to the large number of channels with a smaller memory footprint to store the feature and kernel data. The same hardware resources need to be arranged to meet the varied conditions and constraints.

Embodiments of the presently disclosed technology facilitate management of an arbitrary number of PEs, e.g., limited by area or cost, that work together to accelerate a convolution or dense layer of a CNN (or subsequent batches of such layer), by using many degrees of parallelism given a wide range of configurations, e.g., via programming registers. The flexibility may allow a compiler to search for different optimization paths depending on priorities on constraints of each application. The flexibility also applies to layers in a single CNN (e.g., corresponding configuration registers can be updated between layers to process the data flow of each layer differently). In other words, the connections are reconfigurable on the fly.

Figure 13A:
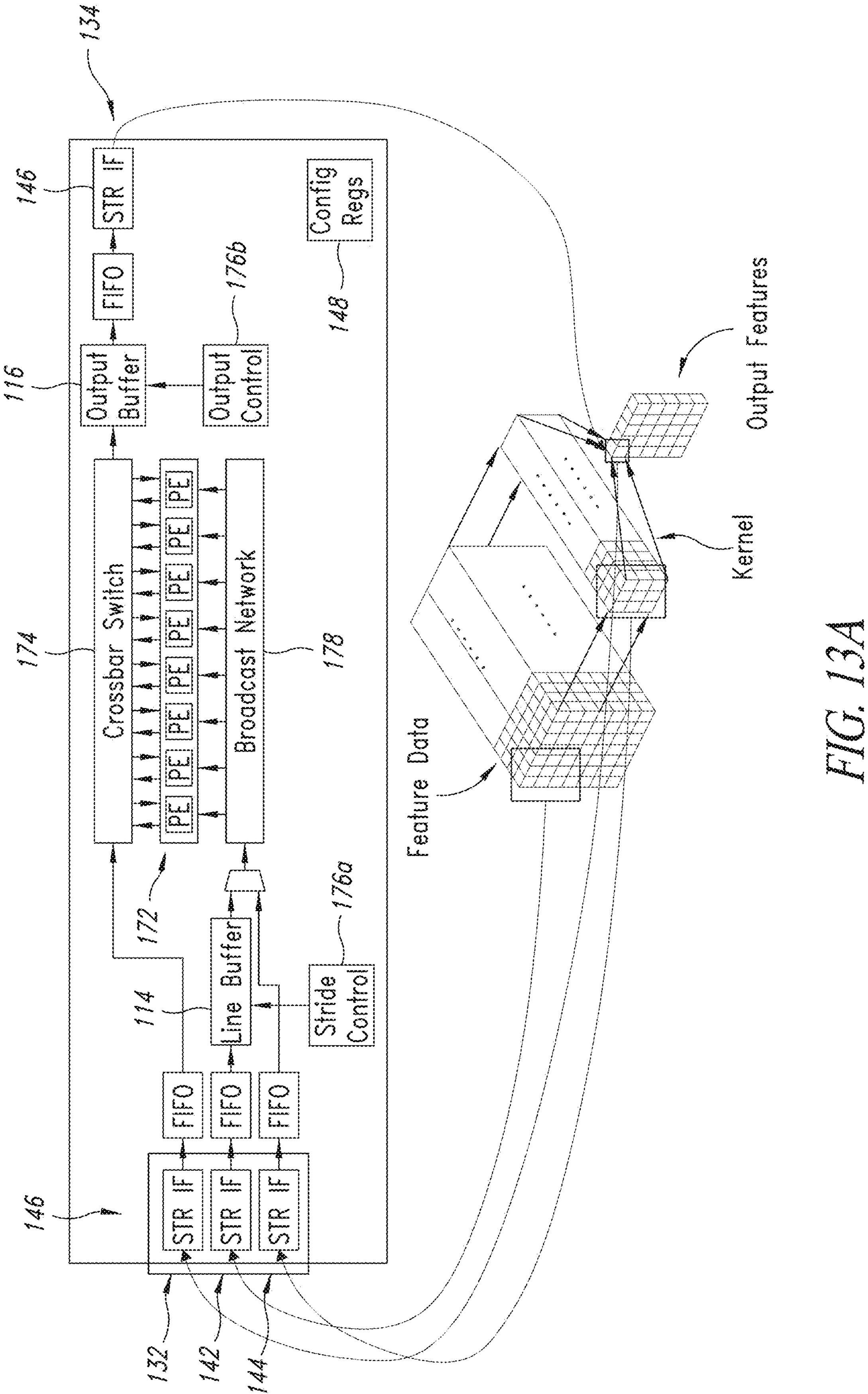
FIGS. 13A and 13B are conceptual diagrams illustrating processing of convolutional operations using some embodiments of a convolutional cluster.

FIG. 13A is a conceptual diagram illustrating processing of convolutional operations using some embodiments of a convolutional cluster, such as the convolutional cluster 170 of FIG. 9A.

The crossbar switch 174 or other reconfigurable interconnect can be configured to connect the PEs 172 in a specific order or pattern, e.g., by connecting partial sum (PS) input or output ports of individual PEs to one another, as well as to the PS input ports 132 and PS output ports 134 of the convolutional cluster. The connections can use eventual buffer(s) (e.g., output buffer 116) or FIFO(s) along corresponding data path(s). In some embodiments, connections from all PS output ports to all PS input ports are available for configuration. In some embodiments, a custom subset of connections are available for configuration, while some connections are fixed and not configurable (e.g., to simplify the structure or save on costs). The connections available for configuration can be a design-time parameter choice, to provide a desired degree of freedom based on area, power, or throughput factors. In some embodiments, an output control 176*b* is part of or otherwise controlled by the control circuitry 176, e.g., to control PS output data flow from the convolutional cluster.

A broadcast network 178 couples the feature input ports 142 and the kernel input ports 144 to the PEs 172 of the convolutional cluster. Similarly, eventual buffers (e.g., line buffer 114) or FIFOs can be used along corresponding data path(s). On this network, data flows from the feature and kernel inputs to the PEs. At any specific time, data flows from one input depending on the current phase of operation. For example, if the current phase is a loading phase, data flows from the kernel input ports 144; if the current phase is a computing phase, data flows from the feature input ports 142. In some embodiments, a stride control 176*a* is part of or otherwise controlled the control circuitry 176, e.g., to control feature data input to the convolutional cluster.

In some embodiments, a cropping unit (not depicted) can be added to the convolutional cluster to pre-process the feature data by performing cropping and various schemes of padding, e.g., to conduct a kernel decomposition. FIG. 13 illustrates examples of other typical components of a convolutional accelerator (e.g., streaming interfaces 146, configuration registers 148, etc.), which are not described in detail with reference to FIG. 13A.

A PE 172 is an element to perform MVMs that can be connected to other PE(s), via the configured crossbar switch. FIG. 14 is a conceptual diagram illustrating an implementation of a PE based on Near-Memory Computing (NMC).

As illustrated, the PE has a memory bank 1402 (e.g., scratch-pad memories) to store kernel or other data, interface(s) 1404 to stream feature, kernel, and PS data, and filter(s) 1406 for selectively receiving feature or kernel data. The PE may also include a control circuitry 1408 employing backpressure signals that can be received by and sent to the PE to manage dataflow. In some embodiments, the dataflow control 1408 facilitates preventing a single stalled PE from stalling the entire broadcast network 178. Illustratively, in a typical situation where a stream engine is broadcasting the same data to multiple components or devices connected to it through the stream switch, a single one of the components or devices stalling will prevent any further data streaming. In contrast, the control circuitry 1408 that is associated with the crossbar switch and each PE is able to mask the stall signal of each PE independently based on its current status. The control circuitry can check whether a PE received all elements within a frame that were meant to be accepted (e.g., correctly filtered or otherwise selected) by that PE. If part or all of the data are shared between two or multiple PEs, and at least one PE stalls the streaming, then the stream is stalled for all PEs; if there is no data sharing, the stall signal of the PE which received all expected data will be masked and thus ignored.

The PE includes multiple MACs 1410 working in parallel, in order to reach a high number of operations per cycle.

In some embodiments, a feature buffer 1412 can be used by the PE to retain feature data for reuse with, e.g., different output channels. In some embodiments, an output buffer 1414 can be used by the PE to manage latency of the compute elements. In some embodiments, an adder tree 1416 is used by the PE to add the PS of each compute element and the accumulation PS from previous computations.

Depending on the layer geometry to be processed, in some embodiments, feature patches can be stored in the memory bank 1402 and a kernel can be sent to the feature buffer 1412 to produce an entire output feature map of one channel (e.g., instead of pixel-by-pixel processing). The output data can then be re-organized at the external output buffer 1414, if applicable.

FIG. 15 is a conceptual diagram illustrating an implementation of a PE based on In-Memory Computing (IMC).

In IMC implementations, the computing elements are located inside memory 1502 itself. The memory 1502 can be modeled as units in multiple locations that can store unrolled kernels, with the memory units performing multiple MAC operations, and can include a buffer for the unrolled feature patch that is shared among all the MAC operations. Therefore, an IMC tile can be considered a direct implementation of a MVM. Similarly to an NMC implementation, the PE can include interface(s) 1504 to stream feature, kernel, and PS data, filter(s) 1506 for selectively receiving proper feature or kernel data, and a control 1508 employing backpressure signals that can be received by and sent to the PE to manage dataflow. In some embodiments, the dataflow control 1508 facilitates preventing a single stalled PE from stalling the entire broadcast network 178. In some embodiments, an output buffer 1514 can be used by the PE to manage latency of the compute elements.

In various embodiments, a convolutional cluster can include either NMC-based PE(s), IMC-based PE(s), or a combination of both implementations.

With reference to FIG. 13A, the PEs 172 can be chained or otherwise interconnected at run-time, e.g., based on the geometry, kernel dimensions, or other constraints of a CNN layer to be processed, by programming the configuration registers 148 accordingly. Various interconnection configurations (e.g., spanning from a single chain connecting every PE to all PEs working in parallel) can be achieved. For example, with 4 PEs the following interconnection of PEs can be configured:

- 4 chains of 1 PE working in parallel;
- 3 chains of 1 PE working in parallel (the 4th PE can be either switched off or loaded with partial data from a new batch or layer);
- 2 chains of 2 PEs connected in series, working in parallel;
- 1 chain of 3 PEs connected in series (the 4th PE can be either switched off or loaded with partial data from a new batch or layer); or
- 1 chain of 4 PEs connected in series.

Once the processing of a layer is complete, a new configuration of PE interconnection can be programmed based on a layer with a different geometry. Configurable interconnection of PEs can map an entire kernel (or a batched kernel) onto available PEs, as no (or less) PS data will be stored for subsequent accumulation. Illustratively, if a single PE is performing multiple batches and accumulating PS data, a large local buffer memory is needed to feed back on the accumulation port the output data of the current batch processed to be used in the next accumulation round. If such a local buffer memory is not available, the output data is sent to the external memory instead, increasing latency and power consumption. On the other hand, if two PEs (or more) are available and chained together, PS of the current batch can be transferred from one PE to the immediate succeeding PE directly with no buffer. In cases where the chained PEs are not enough to map the entire kernel, external memory is needed to perform multiple accumulation rounds, but the number of such rounds is significantly reduced. For example, in the case of two PEs chained together, the number of accumulation rounds is halved than with a single PE, and only the output of the second PE needs to be stored. If the entire kernel can be mapped on all available PEs in chain, the PS data of the last PE will not be stored in external memory (nor in a local buffer) but can be sent directly to an activation unit connected to the stream switch to be used to generate the feature data of the next layer. In some embodiments, a compiler can determine whether to map an entire kernel on available PEs or to decompose it along an arbitrary axis; for example, kernels having a size larger than what the available PEs can accommodate may be decomposed.

Figure 16:
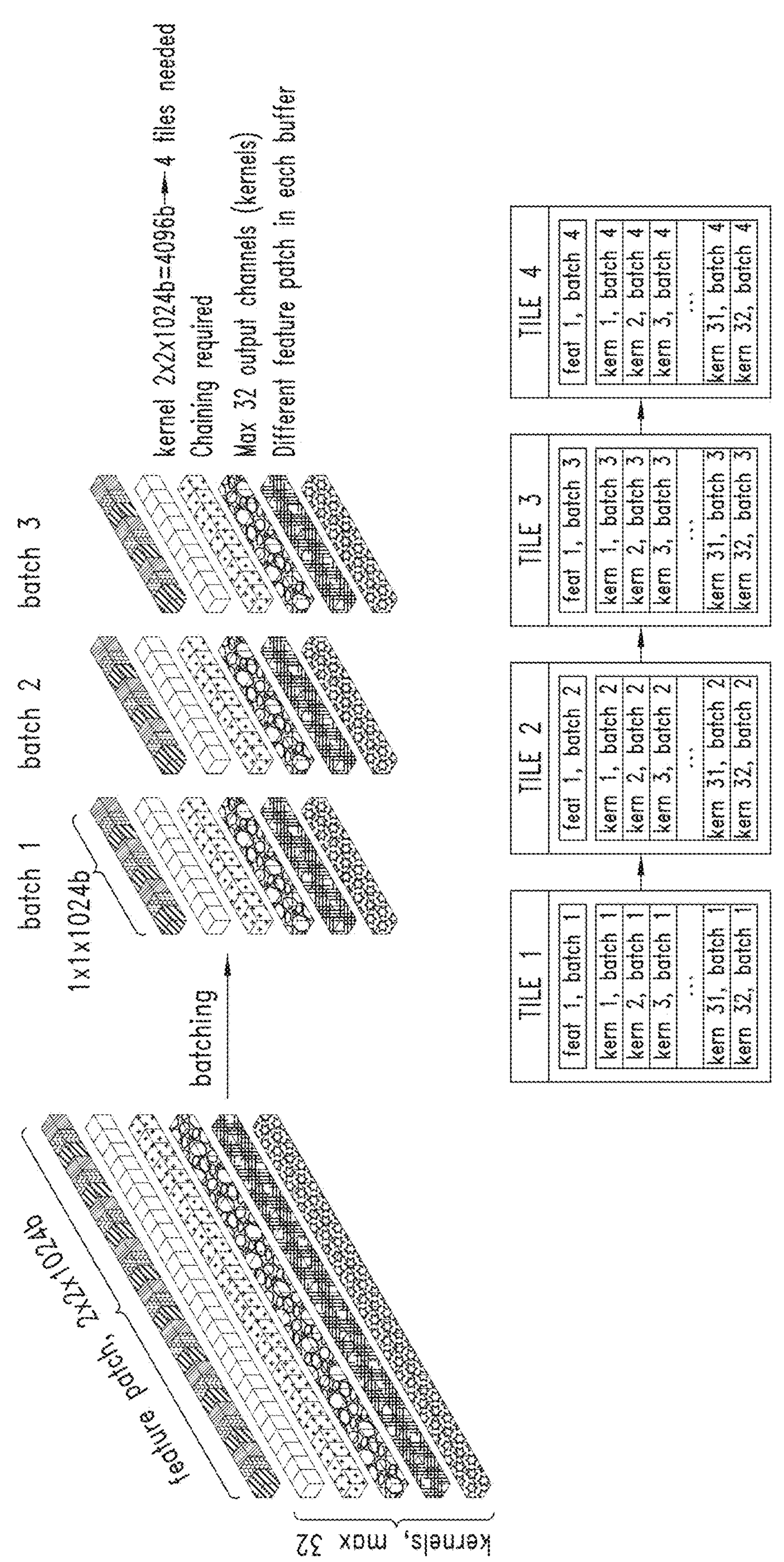
FIGS. 16-18 are conceptual diagrams representing different interconnection configurations examples of processing elements.
Figure 17:
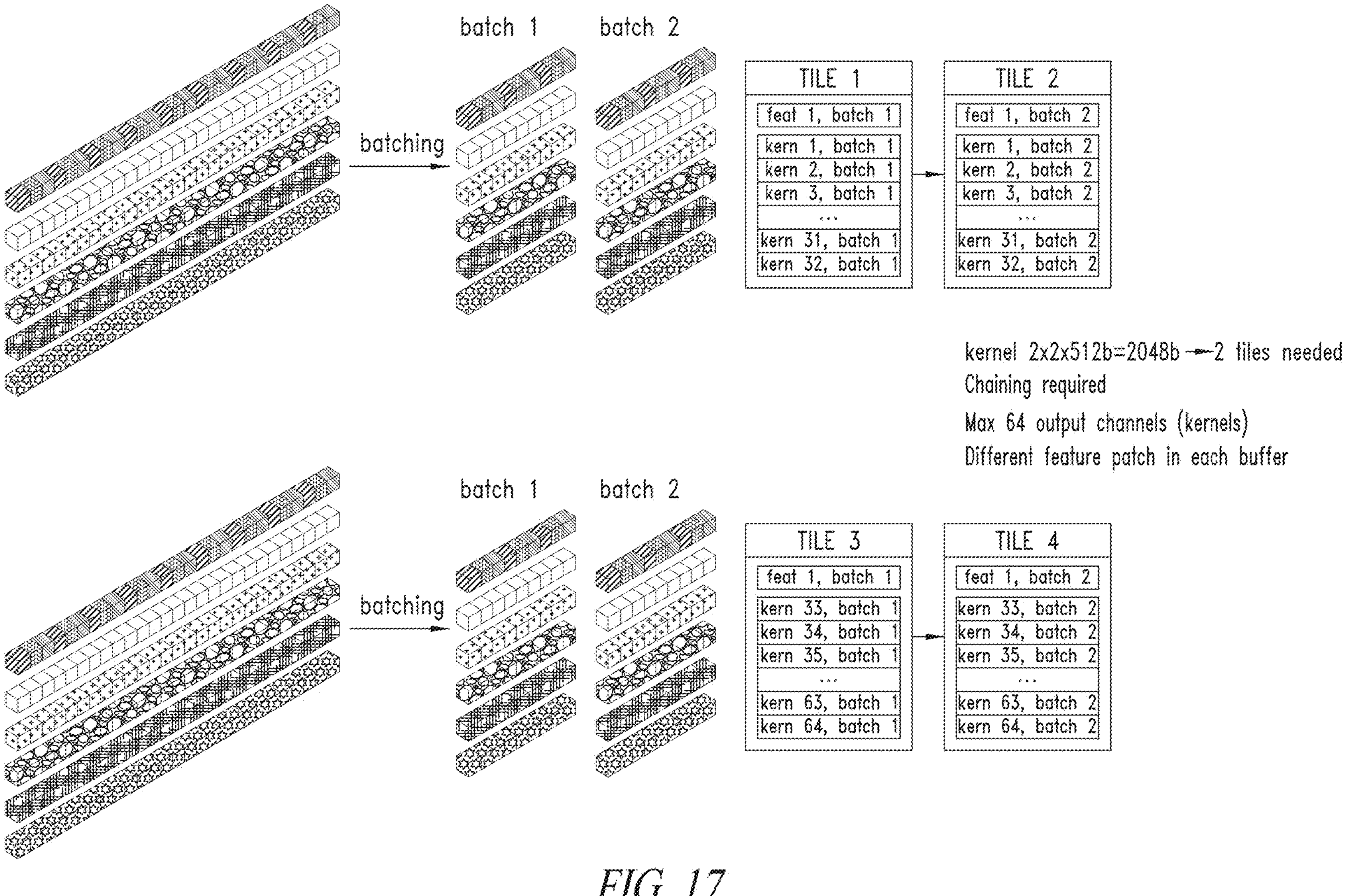
Figure 18:
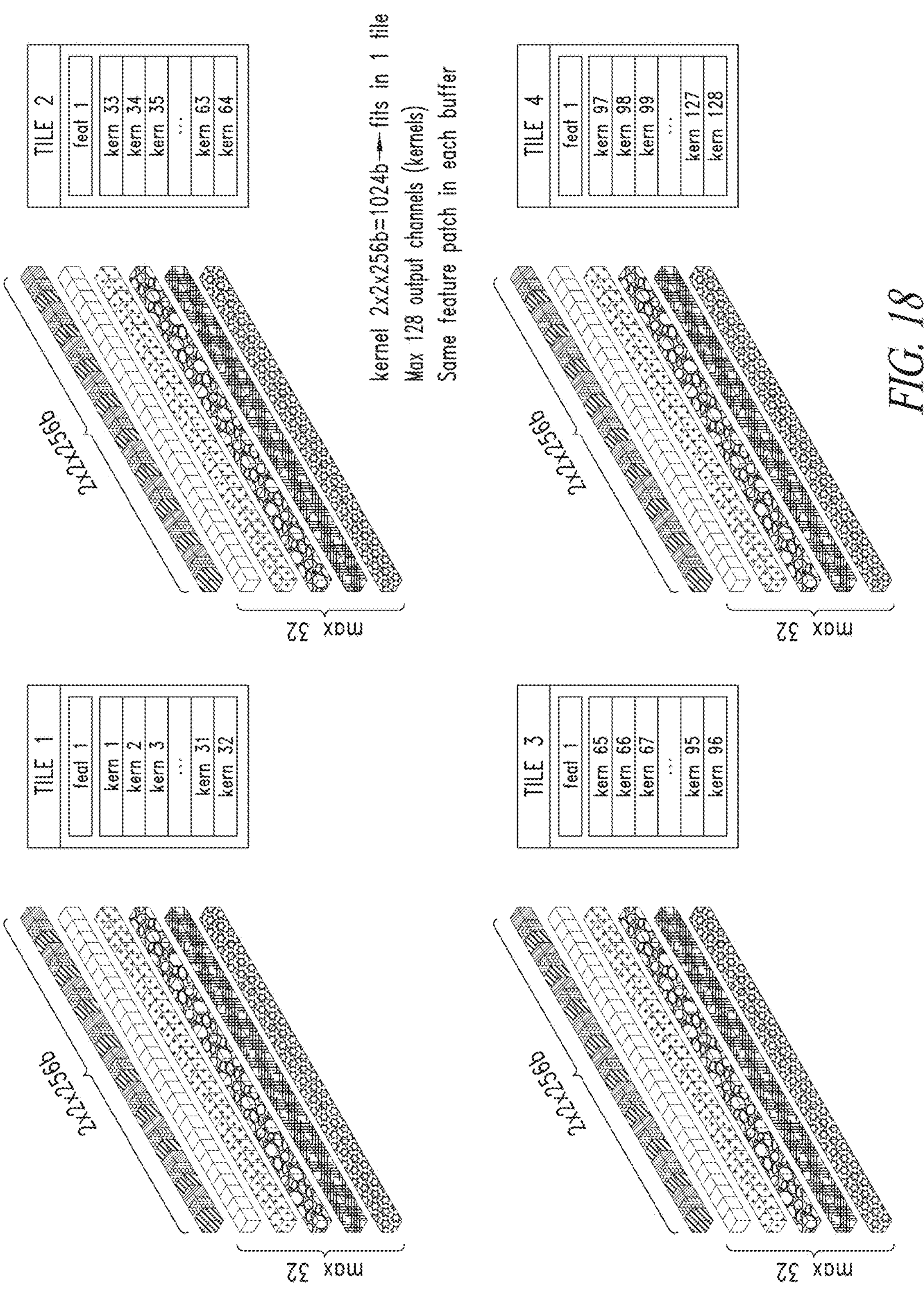

As an example, assume each PE (e.g., implemented via an NMC or IMC tile) can store up to 32 different kernels (corresponding to 32 output channels) and a feature patch of 1024*b*, with variable precision of 1*b*, 2*b*, or 4*b* (respectively 1024, 512, or 256 different elements of a kernel/feature patch can be stored). FIG. 16 is a conceptual diagram representing an interconnection configuration where 1 chain of 4 such PEs are connected in series. FIG. 17 is a conceptual diagram representing an interconnection configuration where 2 chains, each including 2 such PEs connected in series, work in parallel. FIG. 18 is a conceptual diagram representing an interconnection configuration where 4 chains, each including 1 such PE, work in parallel.

With reference to FIG. 13A, in some embodiments, dataflow of feature data on the broadcast network 178 is managed by using backpressure signals (e.g., stall signals) generated by each PE. The configuration registers 148 can be programmed to determine, for each PE (e.g., via its dataflow control), which is the first and last element of a periodic string of feature data elements as valid for the PE and accepted from the broadcast network. When all elements of input feature are contiguous, PEs that have received all the expected elements will not stall the broadcast network 178, but a single PE that did not receive all of its expected elements will stall the entire broadcast. Illustratively, with reference to FIGS. 19 and 20, the filtering unit or mechanism (not depicted) of each PE is counting the number of valid transactions that happen on the broadcast stream, so there is a counter that increases for each count of a valid transaction. For each PE, there are dedicated configuration registers where the configuration information (e.g., about the periodicity of the stream, the first valid value and the last valid value) for each PE can be stored to be used by the filtering unit. This unit then simply stalls the streaming on the broadcast network if and, in some cases, only if the number of transactions that happened on the broadcast network is between its configured first and last valid values. If the counter reaches a valid value (i.e., a value that is lower than the periodicity) that is lower than the first or higher than the last, then the stall signal is masked to be ignored; in contrast, if the counter reaches a valid value that is between the first and the last, then the stall signal is not masked and, if asserted, will stall the entire broadcast network.

Figure 19:
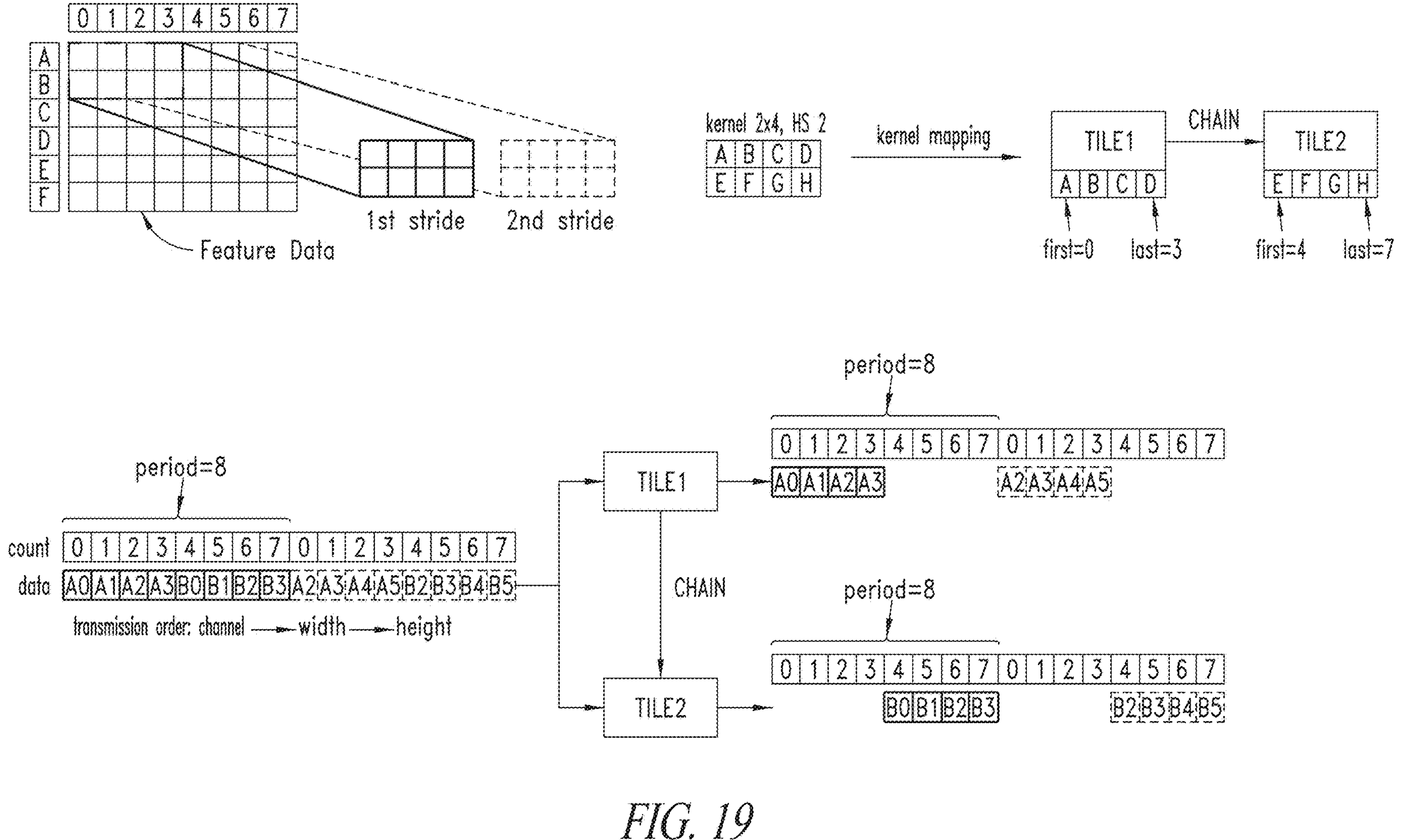
FIGS. 19 and 20 are conceptual diagrams illustrating dataflow of feature data in accordance with different configurations.
Figure 20:
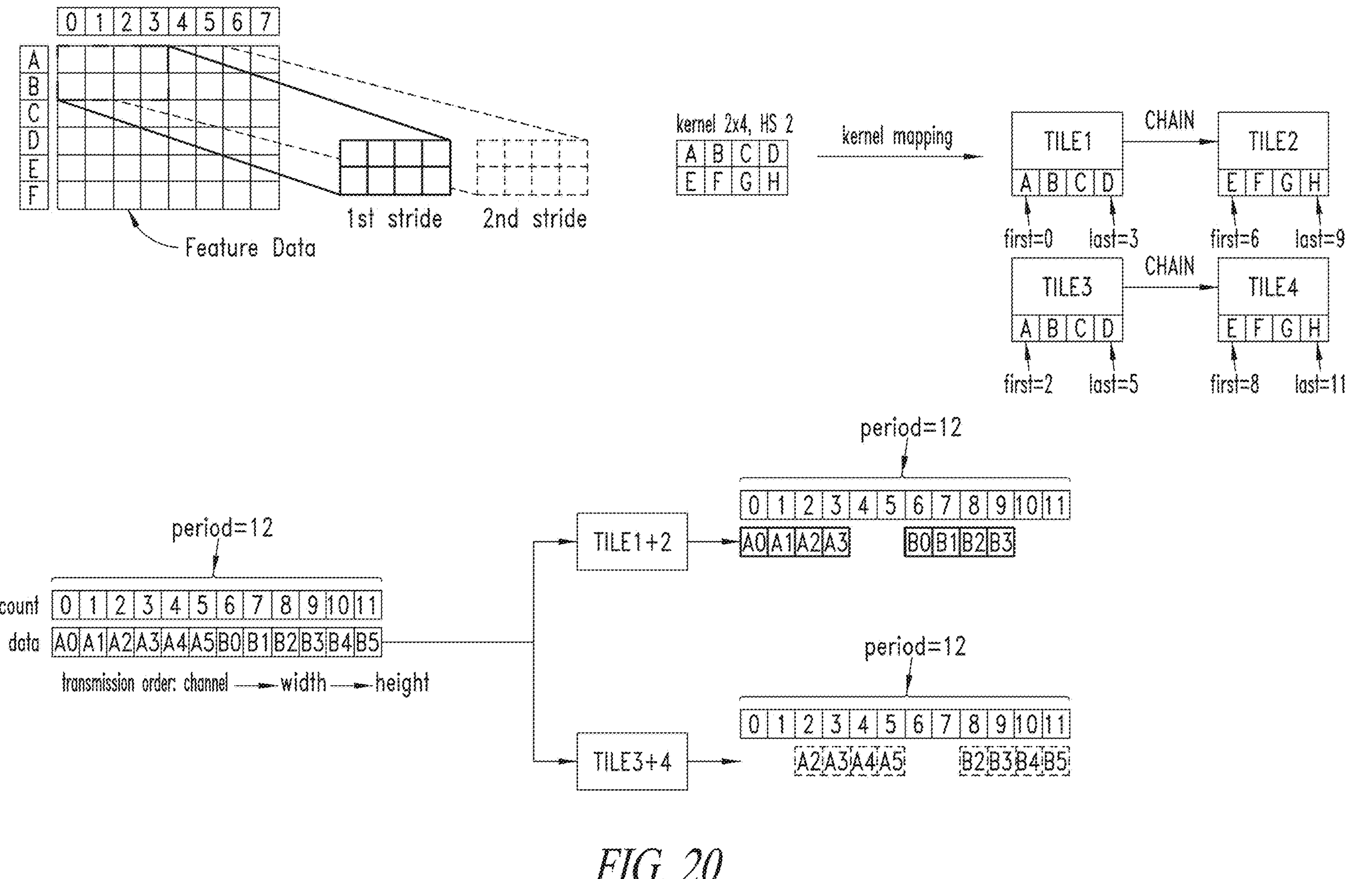

This configuration for each PE can be performed at run-time, e.g., based on the geometry, kernel dimensions, or other constraints of a CNN layer to be processed, to match the intended use of the PEs interconnected via the crossbar switch 174. Similarly, once the processing of a layer is complete, a new configuration can be programmed based on a layer with a different geometry. FIG. 19 is a conceptual diagram illustrating dataflow of feature data in accordance with a configuration without overlapping use of feature elements. FIG. 20 is a conceptual diagram illustrating dataflow of feature data in accordance with a configuration with overlapping use of feature elements.

FIG. 19 depicts an example of unicast, where data is sent to a single PE each cycle. Two different displacements of the kernel are overlapped with the underlying feature tensor, generating two feature patches relative to the first stride and the second stride. A mix of alphanumerical coordinates is used to indicate the x and y indexes of the feature tensor. To transfer the $1^{st}$ stride, a sequence of data that contains A0, A1, A2, A3, B0, B1, B2, B3 is transferred. Because a feature patch is made of 8 elements, the periodicity of the filtering mechanism is 8. This 8 elements kernel is mapped on two different PEs in chain, each PE containing 4 elements of said kernel. The first PE is to accept only the first 4 elements, which are element 0, 1, 2, 3 (A0, A1, A2, A3), so its first and last values as set with configuration registers are programmed with 0 and 3. Likewise, the second PE is to accept B0, B1, B2, B3, which are element 4, 5, 6, 7, so its first and last values as set with configuration registers are programmed with 4 and 7. When the counter reaches the maximum value 7, meaning 8 elements have been counted, the counter is reset because it has reached its programmed periodicity. The $2^{nd}$ stride will be streamed likewise, this time starting from A2 and ending with B5. Again 8 elements are streamed, so the first PE will accept the first 4 (A2, A3, A4, A5) and the second PE will accept the last 4 (B2, B3, B4, B5). This is a unicast stream because the two PEs do not receive a common element.

In contrast, FIG. 20 depicts an example of broadcast streaming, where part of the feature data is sent to multiple PEs in the same cycle. In this case, the stall of a PE that shares data with another PE is not ignored, otherwise some data could be lost. In this example, the $1^{st}$ stride and the $2^{nd}$ stride are not transferred in two different moments, because both strides are transferred at the same time on two different chains working in parallel. The same kernel as used with reference to FIG. 19 is mapped on two different chains of two PEs whose configuration registers are programmed to accept only the data which are relative to the stride each chain is supposed to process. To do so, the entire sequence of data A0, A1, A2, A3, A4, A5, B0, B1, B2, B3, B4, B5 is broadcast. As there are 12 elements, the periodicity will be 12. Note that in the previous case corresponding to FIG. 19, part of the data was sent twice, while in this example all the elements are sent just once. As illustrated, the data composing the first stride are A0, A1, A2, A3, B0, B1, B2, B3, corresponding to elements 0, 1, 2, 3, 6, 7, 8, 9. The first PE of the first chain is thus programmed with first 0 and last 3; the second PE of the first chain is thus programmed with first 6 and last 9. The same reasoning is applied to the second chain, which is to accept the second stride composed by A2, A3, A4, A5, B2, B3, B4, B5, corresponding to elements 2, 3, 4, 5, 8, 9, 10, 11. The first PE of the second chain is thus programmed with first 2 and last 5; the second PE of the second chain is thus programmed with first 8 and last 11.

In some embodiments, a more complex implementation to manage 2D or 3D tensor shapes (where elements that a PE expects to receive can be non-contiguous) can use multiple loops via nested counters, each with their first, last, and period values along a determined axis. In some embodiments, a programmable tag engine can support the broadcasting to reach a custom degree of addressability of each PE.

With reference to FIG. 13A, in some embodiments, dataflow of kernel data on the broadcast network 178 is managed similarly as feature data, with an additional loop (e.g., via another nested counter) for the number of output channels (number of different kernels) to be stored on PE memory.

The stride control 176*a* can manage different data transmission schemes. This can be achieved by configuring and using single or nested loops (e.g., implemented with counters) whose parameters (e.g., order, period, etc.) can be programmed in the configuration registers 148. Similarly, the stride control configuration can be performed at run time, e.g., based on the geometry, kernel dimensions, or other constraints of a CNN layer to be processed, to match the intended use of the PEs.

In some embodiments, the presently disclosed technology is implemented in the context of a hierarchical use of scratch-pad memories to store kernel, feature, and accumulation data. With the increase of data locality and reuse, frequent power-expensive fetch operations from off-chip memory may be avoided.

Figure 32:
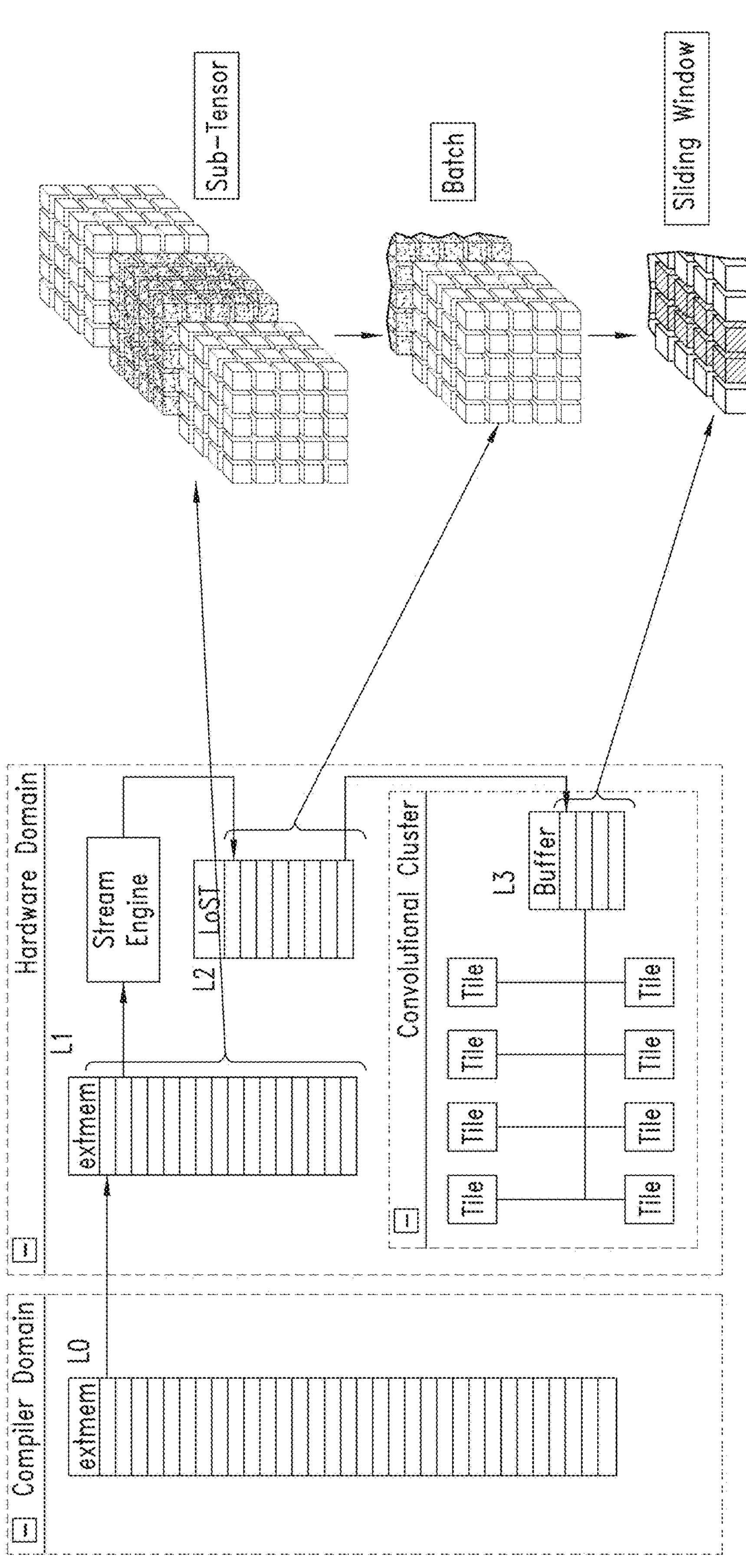
FIG. 32 is a conceptual diagram illustrating a data storage hierarchy in accordance with some embodiments of the presently disclosed technology.

For example, FIG. 32 depicts a data storage hierarchy in accordance with some embodiments of the presently disclosed technology. As illustrated, a big chunk of the original tensor data (referred to as "sub-tensors") to be processed can be fetched from a very large external memory L0 (e.g., external memory or memory 104) that stores the entire tensor, and saved on a large on-chip memory L1 (e.g., part of memory 104, yet smaller than L0), e.g., optimized for a small cost/density FOM. Dedicated DMAs (e.g., stream engines connected to the stream switch) can fetch batches of the L1 sub-tensors to a local storage L2 (e.g., another cut of memories, different from memories 104, directly coupled to the stream switch, such as an on-chip memory coupled to the stream switch, accessible through the simplified stream switch protocol instead of the system bus interface that is slower and requires complex arbitration), which can use a memory smaller than L1 yet coupled with circuitry specialized to extract patches of the same data to perform a stride operation. Such a patch is then fed to an even smaller buffer L3 (e.g., working memory of a PE as memory bank 1402 of FIG. 14 or memory 1502 of FIG. 15), which is shared between all PEs of a convolutional cluster to perform a sliding window of the original tensor.

Figure 21:
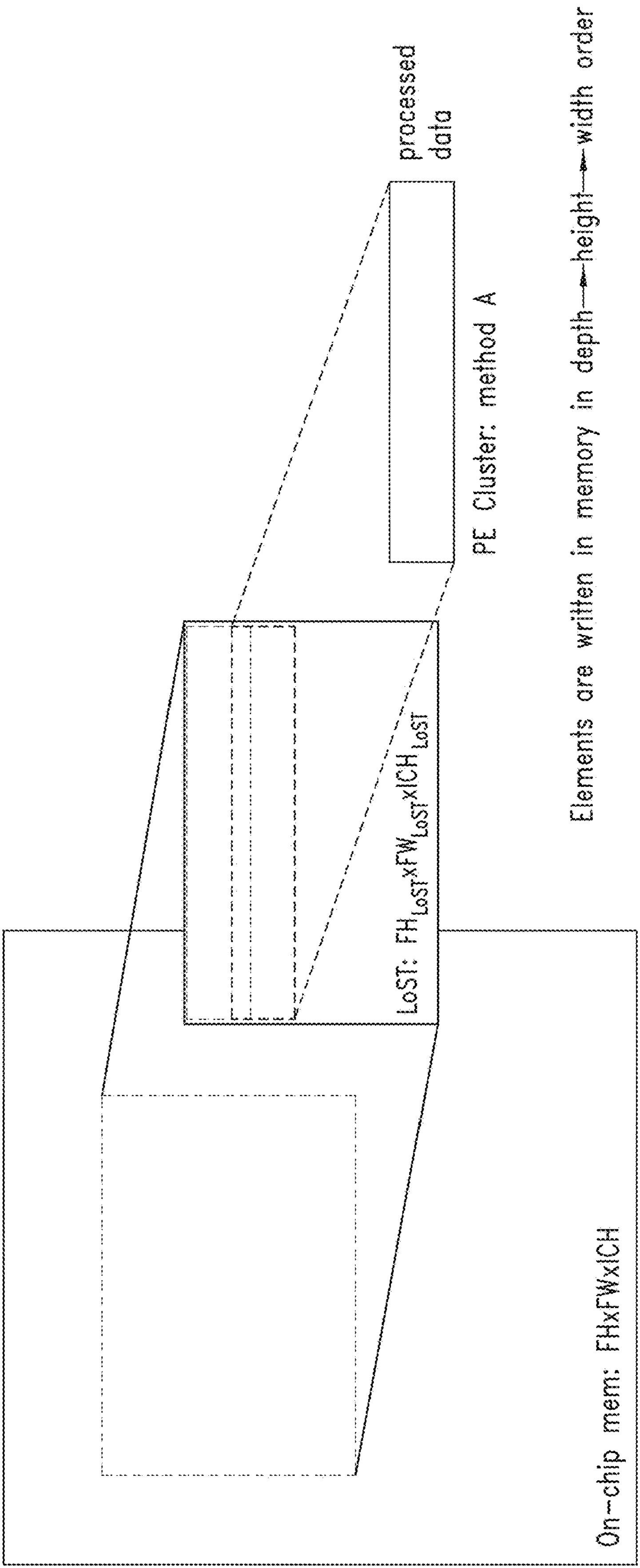
FIGS. 21 and 22 are conceptual diagrams illustrating different embodiments of stride control.

FIG. 21 is a conceptual diagram illustrating an embodiment of stride control, where horizontal stride is performed by the stride control 176*a*, and vertical stride can be performed by an ancillary unit connected to the stream switch 155. Here, the stride control 176*a* can facilitate sending a contiguous stripe of the feature data in channel, height, and width order.

Figure 22:
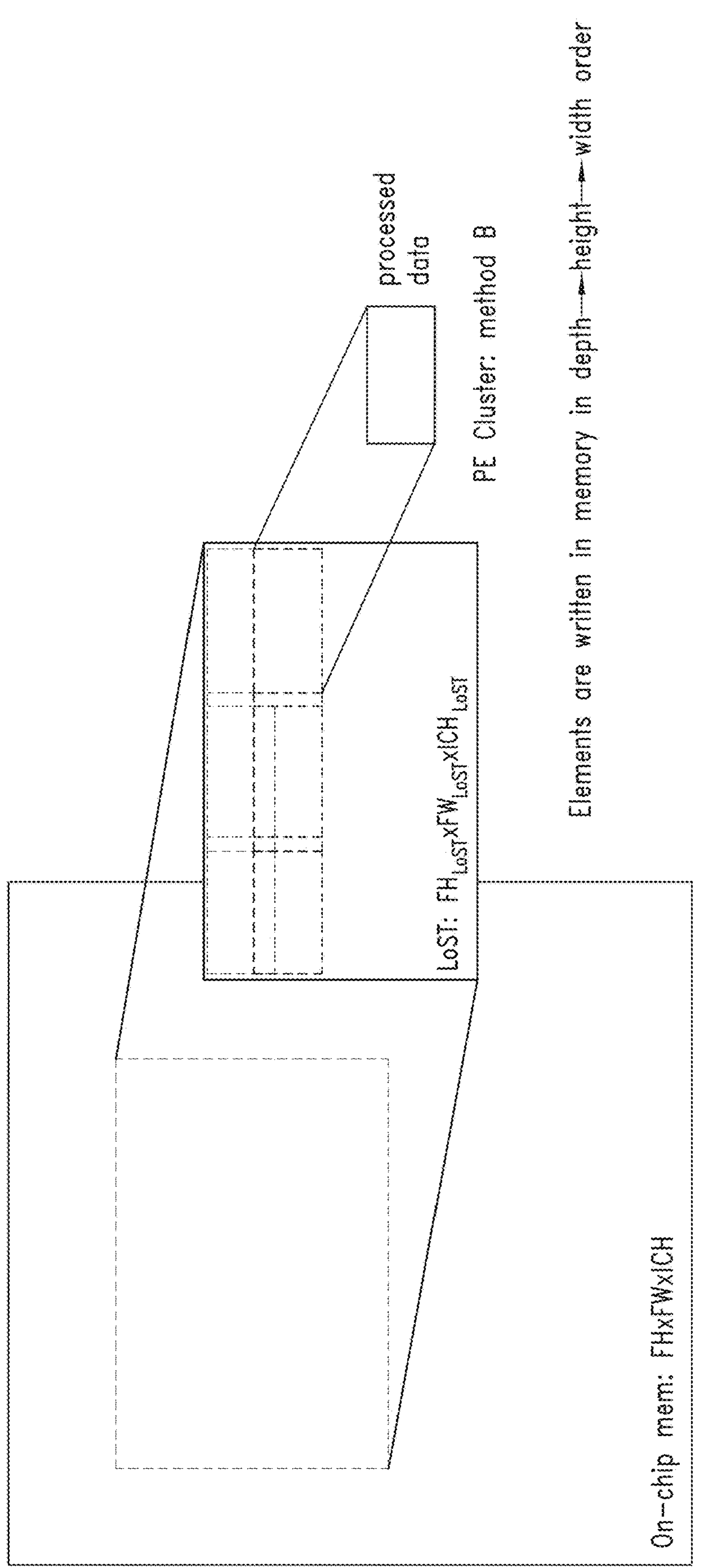

FIG. 22 is a conceptual diagram illustrating another embodiment of stride control, where the stride control 176*a* performs both vertical and horizontal stride. Here, the order of data transmission is channel, width, and height.

With reference to FIG. 13A, in some embodiments, the convolution cluster includes a dedicated line buffer 114 and output buffer 116. The line buffer 114 can store a programmable number of lines of an input feature and the output buffer 116 can store a programmable number of PS data, e.g., by programming the configuration registers 148. The output buffer 116 can be used to perform "image to column" (im2col) algorithms, to store accumulation data for feedback, or to reorder the output feature map (e.g., if multiple strides are computed in parallel). Kernels are streamed from the input interface 144 to the PEs through the broadcast network 178. If a PE is not used during computation, it is switched off and its memory is ignored.

Figure 13B:
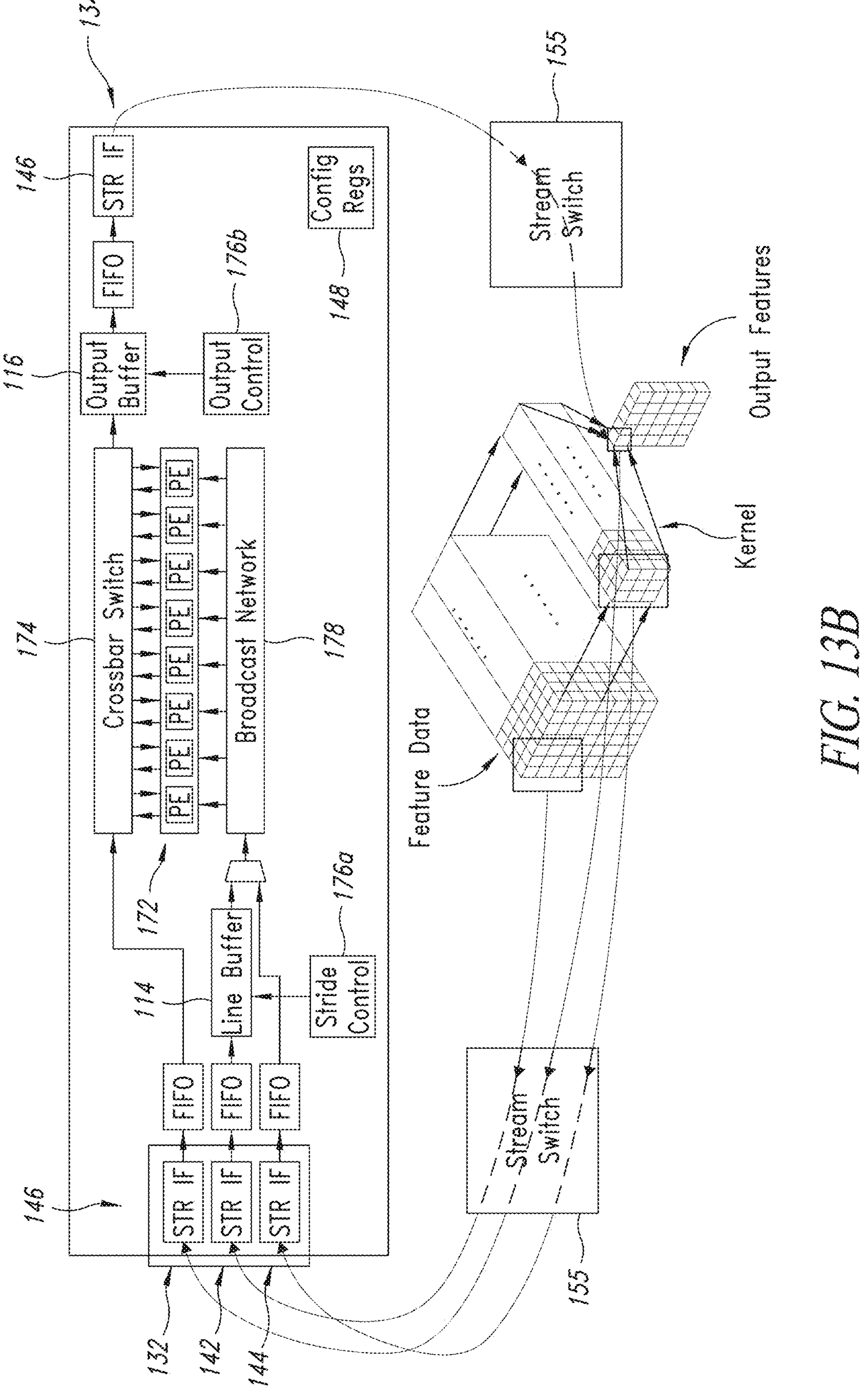

FIG. 13B illustrates an example relationship between a corresponding stream switch 155 and the convolutional cluster of FIG. 13A during the processing of convolutional operations, in accordance with some embodiments. As illustrated, feature data, kernel data, and/or partial sum (or other partial or intermediate output feature data) stored external to the convolutional cluster can be streamed through the stream switch 155 into input ports of the convolutional cluster. Alternatively or in addition, partial sum (or other output data) from the output ports of the convolutional cluster can be streamed through the same or a different stream switch 155, to be stored external to the convolutional cluster.

Figure 23:
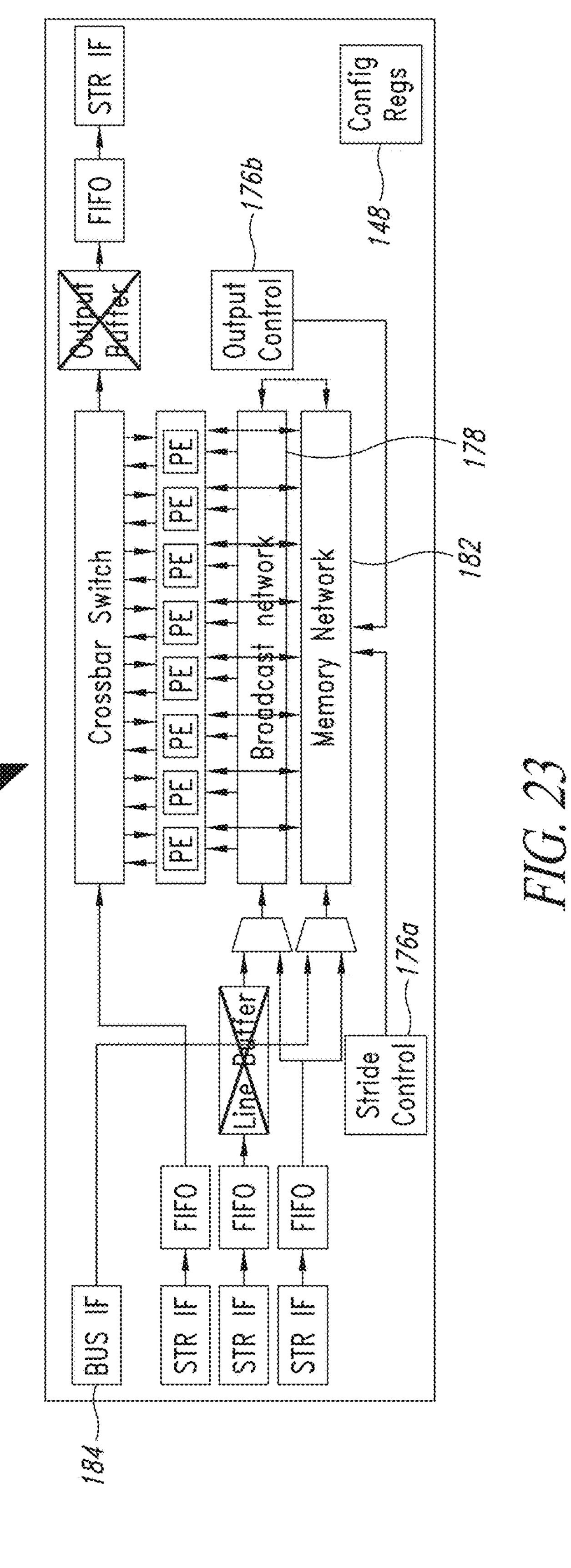
FIG. 23 illustrates an example implementation of a convolutional cluster including a memory network, in contrast with the implementation illustrated in FIG. 13A.

With reference to FIG. 23 and in contrast with the implementation illustrated in FIG. 13A, in some embodiments, the convolution cluster includes a memory network 182 (bidirectional) that connects all the PEs, a bus interface 184 (e.g., AXI interface), and the broadcast network 178 (monodirectional). In some embodiments, the bus interface 184 is part of or connected to the main bus system 190 as illustrated in FIG. 9A.

As illustrated, both the line buffer and the output buffer can be disabled, removed, or reduced in size. Through the memory network 182, individual PE's memory can be configured to serve the function of the line buffer, output buffer, or bus-accessible RAM (e.g., access via the bus interface 184). Similar to the configuration of the crossbar switch or broadcast network, the configuration of PE memory can be performed at run-time, e.g., by programming the configuration registers 148 based on the layer requirements.

Figure 24:
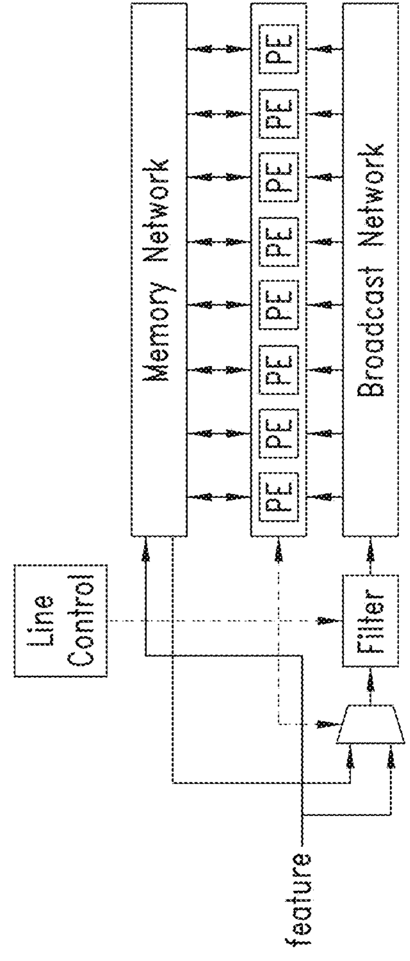
FIG. 24 is a conceptual diagram illustrating an example implementation of a line buffer function by a processing element memory and a memory network.

FIG. 24 is a conceptual diagram illustrating the implementation of a line buffer function by a PE memory and memory network. As described above, when the convolutional cluster includes dedicated line memory and direct access to the line memory, the PEs may operate in a single compute mode and PE memory has limited use (e.g., storing kernel data). In contrast, using the implementation as illustrated in FIG. 24, individual PEs can operate in compute mode or in a memory mode, as determined and configured at run-time. Here, line memory is distributed between PEs, and is accessed through the memory network.

Figure 25:
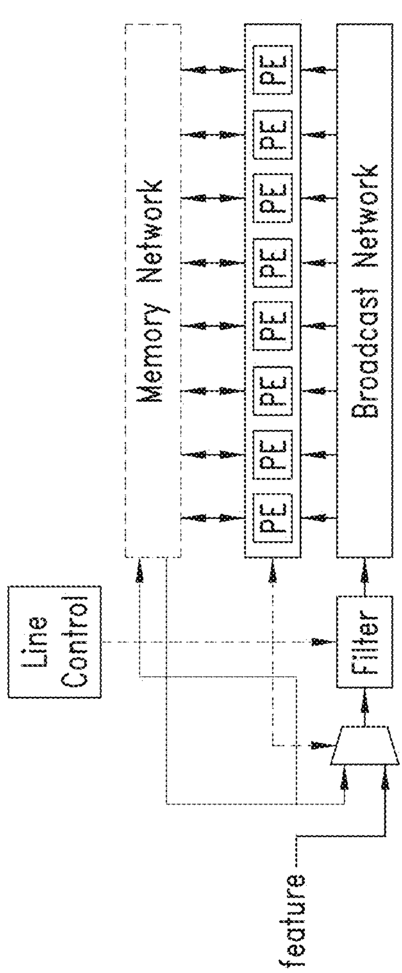

As an example, FIG. 25 is a conceptual diagram illustrating example PEs' mode of operation and memory network configuration for 1×1 kernels. For MVM with 1×1 kernels, there is no need to store lines of the input feature map because there is no data reuse between lines. As illustrated, all the PEs can operate in compute mode: either work in parallel to produce different output feature map elements, or to accommodate a 1×1 kernel whose number of channels can be accommodated on the PEs.

Figure 26:
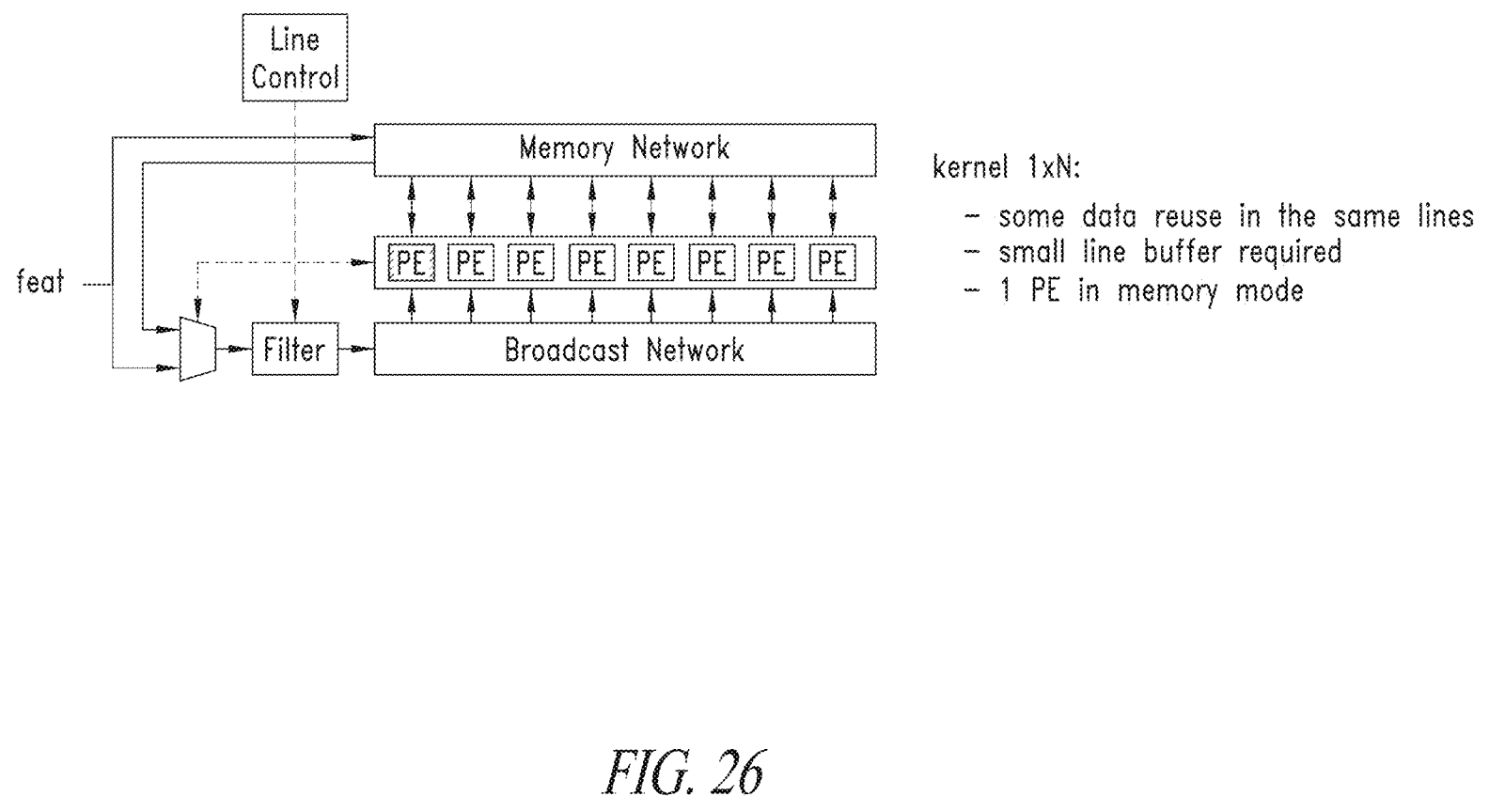

As another example, FIG. 26 is a conceptual diagram illustrating PEs' mode of operation and memory network configuration for 1×N kernels. Here, there is some data reuse in the same line, so a small line buffer is needed. As illustrated, 1 PE can operate in memory mode to serve the function of the small line buffer, while the remaining PEs can operate in compute mode.

As yet another example, FIG. 27 is a conceptual diagram illustrating PEs' mode of operation and memory network configuration for M×N kernels. Here, there is data reuse between lines, so a large line buffer is needed. As illustrated, half PEs can operate in memory mode to serve the function of the large line buffer, while the remaining PEs can operate in compute mode.

Figure 28:
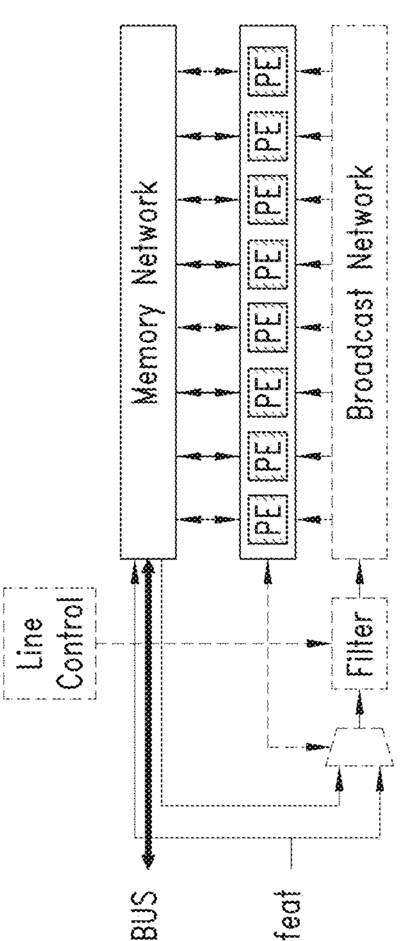
FIG. 28 is a conceptual diagram illustrating processing elements' mode of operation and memory network configuration when a convolutional cluster is used as bus-accessible memory.

As still another example, FIG. 28 is a conceptual diagram illustrating PEs' mode of operation and memory network configuration when the entire convolutional cluster is used as bus-accessible memory. Here, all PEs operate in memory mode and their memory is accessible via the memory network and a bus interface (e.g., the bus interface 184) by host CPU(s) or other processing core(s).

Similar to the implementation of line buffer function, the function of output buffer can be implemented based on PEs' mode of operation and memory network configuration, which can be performed at run-time by programming the configuration registers 148. As an example, FIG. 31 is a conceptual diagram illustrating output memory (e.g., replacing or reducing output buffer) distributed between PEs in accordance with their modes of operation and accessible through the memory network.

Figure 29:
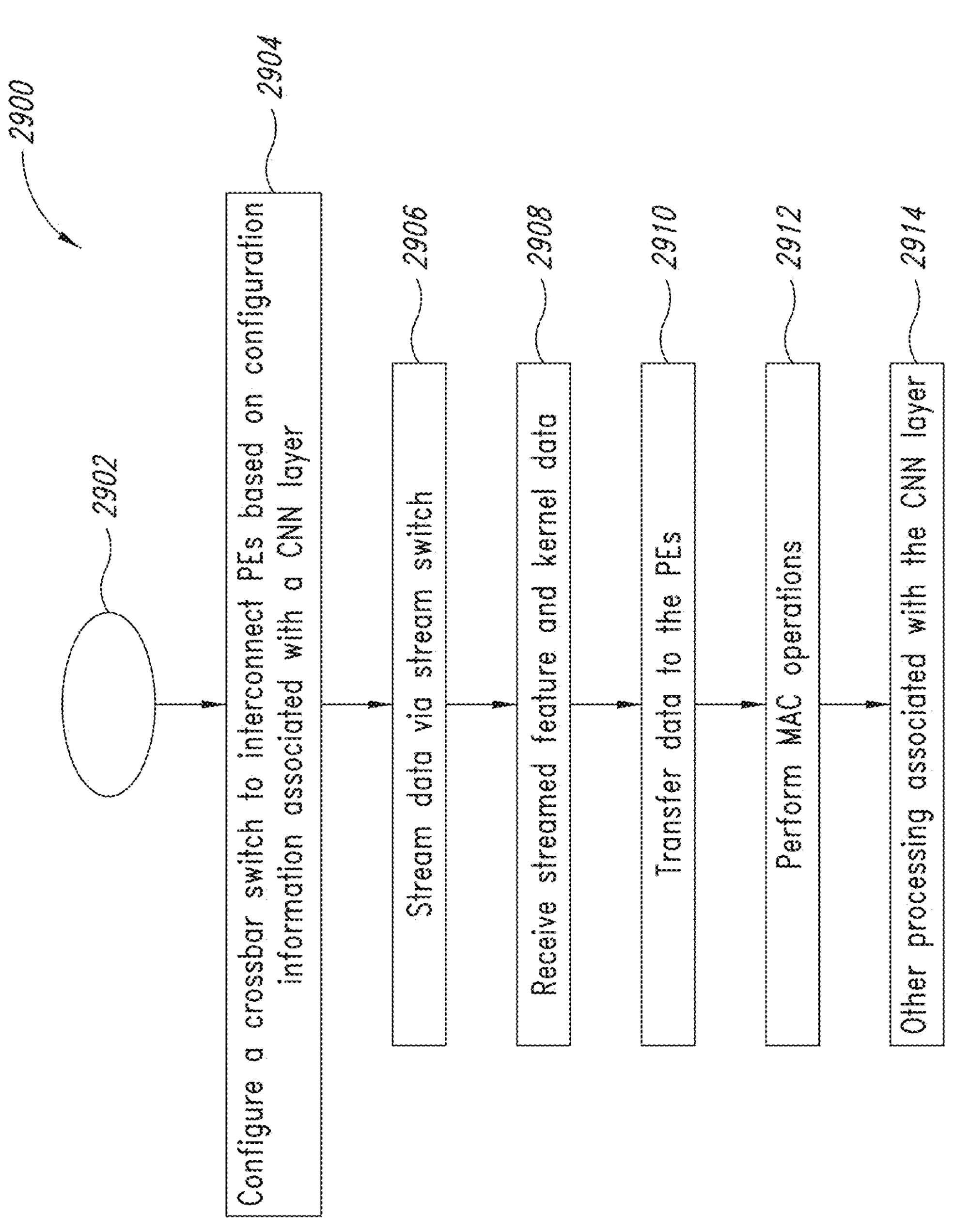
FIG. 29 illustrates a logical flow diagram generally showing an embodiment of a method for controlling a convolutional cluster.

FIG. 29 illustrates a logical flow diagram generally showing an embodiment of a method 2900 for controlling a convolutional cluster, which may be performed, for example, at least in part by the convolutional cluster 170 using the control circuitry 176 as discussed above with reference to FIGS. 9-22. For convenience, the method 2900 will be described with reference to FIGS. 1-22.

The method 2900 starts at 2902, and proceeds to 2904. At 2904, the method 2900 includes configuring a crossbar switch to interconnect multiple PEs based on configuration information associated with a CNN layer to be processed, such as a convolution layer. As described above (e.g., with reference to FIGS. 9, 13, and 16-18), the crossbar switch 174 or other reconfigurable interconnect can be configured to connect the PEs 172 in a specific order or pattern, e.g., to match the processing needs of the CNN layer or at least a part thereof.

At 2906, the method 2900 includes streaming data between one or more stream engines of a hardware accelerator (e.g., stream engine(s) 150 of the hardware accelerator 110) and one or more functional circuits (e.g., convolutional accelerator(s) 112) of the hardware accelerator via a stream switch (e.g., stream switch 155). At 2908, the method 2900 includes receiving streamed feature data and streamed kernel data. As described above (e.g., with reference to FIGS. 9-13), the stream engine 150 can stream data, such as feature data or kernel data stored in memory 104, to the convolutional cluster 170 via the stream switch 155, streaming interface(s) 146, etc. The feature data and kernel data can be unrolled and/or batched.

At 2910, the method 2900 includes transferring the streamed data to the PEs 172. As described above (e.g., with reference to FIGS. 13-15, 19, and 20), the broadcast network 178 couples the feature input and the kernel input to the PEs 172, and data can flow on the broadcast network 178 based on the current phase of operation. Individual PEs can selectively receive data from the broadcast network by using reconfigurable filters (e.g., based on backpressure signals).

At 2912, the method 2900 includes performing MAC operations using the PEs 172 and the feature data and kernel data transferred at 2906 and 2908. This can be done in a generally conventional manner, such as described with reference to FIGS. 13-15.

At 2914, the method 2900 includes performing other processing operations associated with the CNN that includes the processed layer, such as accumulating results of batches of data, serializing output data, returning to 2908 to process a subsequent batch of data, transferring data to or from external memory, or combination of the same or the like. In some embodiments, the method 2900 proceeds back to block 2904, to reconfigure the crossbar switch to interconnect the PEs based on configuration information associated with another CNN layer to be processed.

Figure 30:
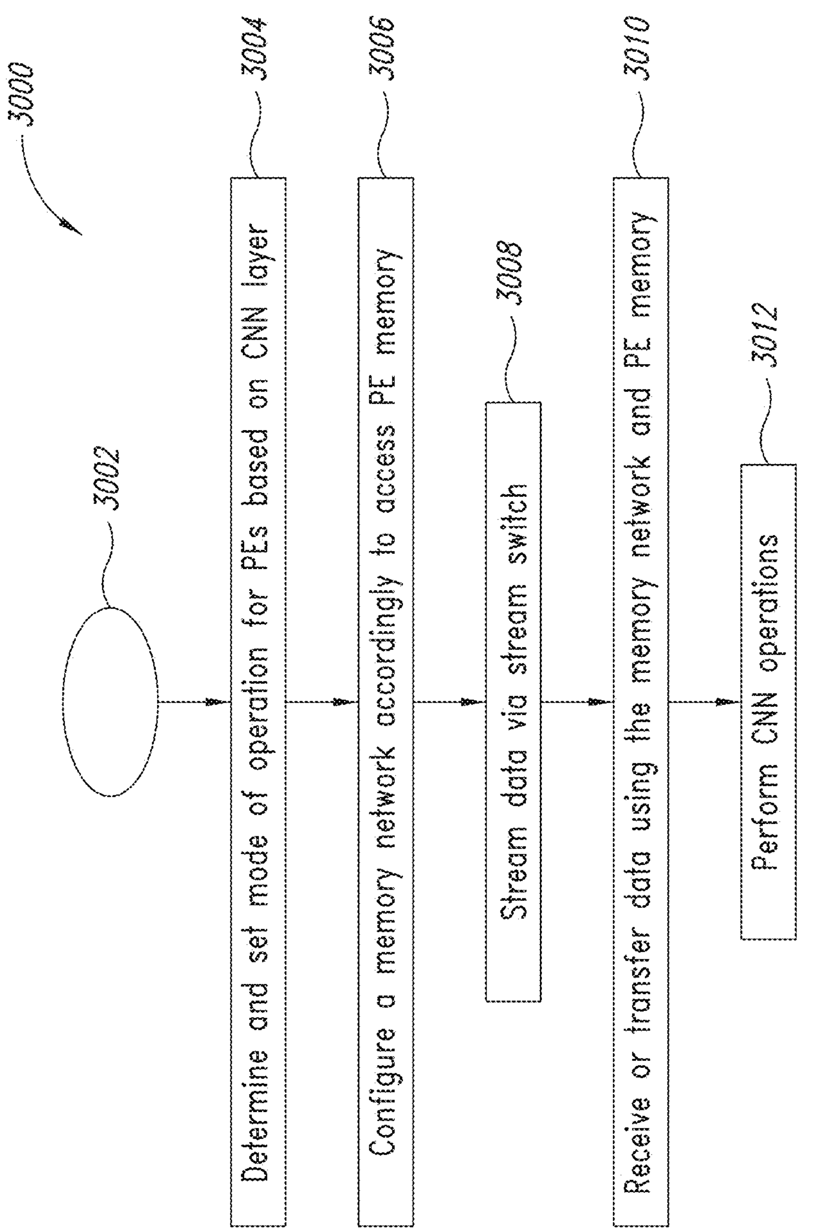
FIG. 30 illustrates a logical flow diagram generally showing an embodiment of a method for managing memory of a convolutional cluster.

FIG. 30 illustrates a logical flow diagram generally showing an embodiment of a method 3000 for managing memory of a convolutional cluster, which may be performed, for example, at least in part by the convolutional cluster 170 using the control circuitry 176 as discussed above with reference to FIGS. 23-28. For convenience, the method 3000 will be described with reference to FIGS. 1-9 and 23-28.

The method 3000 starts at 3002, and proceeds to 3004. At 3004, the method 3000 includes determining and setting a mode of operation for individual PEs of the convolutional cluster 170 based on a CNN layer to be processed, such as a convolutional layer. As described above (e.g., with reference to FIGS. 23 and 24), the convolution cluster 170 includes a memory network 182 that connects all the PEs.

Based on the kernel size, layer geometry, or other requirements of the CNN layer to be processed, a mode of operation (e.g., computer mode or memory mode) is determined and set (e.g., via corresponding configuration registers) for individual PEs. In some embodiments, this determination is also based on other factors such as external memory requirement, processing throughput, structural complexity, or the like.

At block 3006, the method 3000 includes configuring the memory network 182 according to the modes of operations of individual PEs, e.g., as determined and set at 3004, to access PE memory. As described above (e.g., with reference to FIGS. 23-28), the configuration can be performed at run-time. Through the configured memory network 182, individual PE's memory can serve the function of at least a part of the line buffer, output buffer, or bus-accessible RAM.

At block 3008, the method 3000 includes streaming data between one or more stream engines of a hardware accelerator (e.g., stream engine(s) 150 of the hardware accelerator 110) and one or more functional circuits (e.g., convolutional accelerator(s) 112) of the hardware accelerator via a stream switch (e.g., stream switch 155).

At block 3010, the method 3000 includes receiving or transferring streamed data using the memory network and PE memory. This can be done in a generally conventional manner, similar to 2908 and 2910 of the method 2900 described above.

At block 3012, the method 3000 includes performing one or more CNN operations (e.g., MAC operations) using the convolutional cluster 170 with the configured memory network. This can be done in a generally conventional manner, similar to 2912 and 2914 of the method 2900 described above. In some embodiments, the method 3000 proceeds back to block 3004, to re-determine modes of operation for individual PEs (e.g., based on another CNN layer to be processed).

Embodiments of the foregoing processes and methods may contain additional acts not shown in FIGS. 29 and 30, may not contain all of the acts shown in FIGS. 29 and 30, may perform acts shown in FIGS. 29 and 30 in various orders, may combine acts, may split acts into separate acts, and may be otherwise modified in various respects.

In some embodiments, a hardware accelerator includes a plurality of functional circuits; a stream switch; and a plurality of stream engines coupled to the plurality of functional circuits via the stream switch. The plurality of stream engines, in operation, generate data streaming requests to stream data to and from functional circuits of the plurality of functional circuits. The plurality of functional circuits includes at least one convolutional cluster, the convolutional cluster including a plurality of processing elements coupled together via a reconfigurable crossbar switch. The reconfigurable crossbar switch is coupled to the stream switch, and the reconfiguration crossbar switch, in operation, streams data to processing elements of the cluster from the stream switch, from processing elements of the cluster to the stream switch, and between processing elements of the cluster.

In some embodiments, the at least one convolutional cluster includes a broadcast network. The broadcast network is coupled to the stream switch, and the broadcast network, in operation, streams data from the stream switch to processing elements of the processing cluster.

In some embodiments, the crossbar switch, in operation, streams partial sum data between the processing elements of the plurality of processing elements.

In some embodiments, the plurality of functional circuits include a plurality of convolutional clusters, one or more of the plurality of convolutional clusters comprising a reconfigurable crossbar switch.

In some embodiments, the hardware accelerator includes configuration registers, which, in operation, store configuration information for configuring the crossbar switch, the configuration information indicating a pattern of interconnections between the processing elements of the plurality of processing elements.

In some embodiments, individual processing elements of the plurality of processing elements comprise a memory. In some embodiments, at least one processing element of the plurality of processing elements is configured to perform matrix-vector multiplications (MVMs). In some embodiments, at least one processing element of the plurality of processing elements comprises an In-Memory Computing (IMC) element. In some embodiments, the at least one convolutional cluster includes a reconfigurable memory network, wherein the memory network is coupled to memories of the plurality of processing elements, and the memory network, in operation, streams data to, from, and between processing elements of the processing cluster. In some embodiments, the hardware accelerator includes configuration registers, which, in operation, store configuration information for configuring the memory network, the configuration information being based on modes of operation associated with individual processing elements of the plurality of processing elements.

In some embodiments, a system includes a host device; and a hardware accelerator. The hardware accelerator includes a plurality of functional circuits; a stream switch; and a plurality of stream engines coupled to the plurality of functional circuits via the stream switch. The plurality of stream engines, in operation, generate data streaming requests to stream data to and from functional circuits of the plurality of functional circuits. The plurality of functional circuits includes at least one convolutional cluster, the convolutional cluster including a plurality of processing elements coupled together via a reconfigurable crossbar switch. The reconfigurable crossbar switch is coupled to the stream switch, and the reconfigurable crossbar switch, in operation, streams data to processing elements from the stream switch, from processing elements to the stream switch, and between processing elements of the processing cluster.

In some embodiments, the at least one convolutional cluster includes a broadcast network, wherein the broadcast network is coupled to the stream switch, and the broadcast network, in operation, streams data from the stream switch to processing elements of the processing cluster.

In some embodiments, the crossbar switch, in operation, streams partial sum data between the processing elements of the plurality of processing elements.

In some embodiments, the plurality of functional circuits include a plurality of convolutional clusters, one or more of the plurality of convolutional clusters comprising a reconfigurable crossbar switch.

In some embodiments, the system includes configuration registers, which, in operation, store configuration information for configuring the crossbar switch, the configuration information indicating a pattern of interconnections between the processing elements of the plurality of processing elements.

In some embodiments, individual processing elements of the plurality of processing elements comprise a memory. In some embodiments, at least one processing element of the plurality of processing elements is configured to perform matrix-vector multiplications (MVMs). In some embodiments, at least one processing element of the plurality of processing elements comprises a Near-Memory Computing (NMC) element. In some embodiments, the at least one convolutional cluster comprises a reconfigurable memory network, wherein the memory network is coupled to memories of the plurality of processing elements, and the memory network, in operation, streams data to, from, and between processing elements of the processing cluster. In some embodiments, the system includes configuration registers, which, in operation, store configuration information for configuring the memory network, the configuration information being based on modes of operation associated with individual processing elements of the plurality of processing elements.

In some embodiments, a method includes streaming data between stream engines of a plurality of stream engines of a hardware accelerator and functional circuits of a plurality of functional circuits of the hardware accelerator via a stream switch, wherein the plurality of functional circuits includes at least one convolutional cluster and the convolutional cluster includes a plurality of processing elements interconnected via a reconfigurable crossbar switch, and wherein the reconfigurable crossbar switch is coupled to the stream switch; and performing, using a processing element of the plurality of processing elements, a computing operation using at least a part of the data streamed from at least one of the stream engines; and streaming data to, from, and between processing elements of the processing cluster via the reconfigurable crossbar switch.

In some embodiments, the computing operation is an In-Memory Computing (IMC) operation.

In some embodiments, the method includes streaming data from the stream switch to processing elements of the processing cluster via a broadcast network.

In some embodiments, streaming data to, from, and between the processing elements of the processing cluster comprises streaming partial sum data between the processing elements via the crossbar switch.

In some embodiments, the plurality of functional circuits comprise a plurality of processing clusters, each comprising a reconfigurable crossbar switch.

In some embodiments, the method includes configuring the crossbar switch based on configuration information indicating a pattern of interconnections between the processing elements of the plurality of processing elements.

In some embodiments, a non-transitory computer-readable medium has contents which configure a stream switch to stream data between stream engines of a plurality of stream engines of a hardware accelerator and functional circuits of a plurality of functional circuits of the hardware accelerator, wherein the plurality of functional circuits includes at least one convolutional cluster and the convolutional cluster includes a plurality of processing elements interconnected via a reconfigurable crossbar switch, and wherein the reconfigurable crossbar switch is coupled to the stream switch; configure a processing element of the plurality of processing elements to perform a computing operation using at least a part of the data streamed from at least one of the stream engines; and configure the reconfigurable crossbar switch to stream data to, from, and between processing elements of the processing cluster.

In some embodiments, the computing operation is an In-Memory Computing (IMC) operation.

In some embodiments, individual processing elements of the plurality of processing elements each comprise a memory.

In some embodiments, at least one processing element of the plurality of processing elements is configured to perform matrix-vector multiplications (MVMs). In some embodiments, the contents configure a memory network to stream data to, from, and between processing elements of the processing cluster. In some embodiments, configuring the memory network is based on modes of operation associated with individual processing elements of the plurality of processing elements.

In some embodiments, a hardware accelerator includes a plurality of processing elements, each processing element having memory associated with the processing element; a stream switch; a plurality of stream engines coupled to a plurality of functional circuits via the stream switch, wherein the plurality of stream engines, in operation, generate data streaming requests to stream data to and from functional circuits of the plurality of functional circuits; a first system bus interface coupled to the plurality of stream engines; a second system bus interface coupled to the plurality of processing elements; and mode control circuitry, which, in operation, sets respective modes of operation for the plurality of processing elements. The modes of operation include a compute mode of operation in which the processing element performs computing operations using the memory associated with the processing element; and a memory mode of operation in which the memory associated with the processing element performs memory operations, bypassing the stream switch, via the second system bus interface.

In some embodiments, the plurality of processing elements includes a plurality of processing circuits and a memory associated with the plurality of processing circuits.

In some embodiments, at least one processing element of the plurality of processing elements comprises one or more In-Memory Computing (IMC) elements.

In some embodiments, the plurality of processing elements form one or more clusters of processing elements, a cluster including a reconfigurable crossbar switch. The reconfigurable crossbar switch is coupled to the stream switch, and the reconfigurable crossbar switch, in operation, streams data to, from and between processing elements of the cluster. In some embodiments, the at least one of the one or more clusters comprises a reconfigurable memory network, wherein the memory network is coupled to memories of the plurality of processing elements, and the memory network, in operation, transfers data to, from, and between processing elements of the processing cluster. In some embodiments, the hardware accelerator includes configuration registers, which, in operation, store configuration information for configuring the memory network, the configuration information being based on modes of operation associated with individual processing elements of the plurality of processing elements.

In some embodiments, the hardware accelerator includes a broadcast network, wherein the broadcast network is coupled to the stream switch, and the broadcast network, in operation, streams data from the stream switch to the processing elements.

In some embodiments, the mode control circuitry includes one or more configuration registers.

In some embodiments, the mode control circuitry includes respective configuration registers embedded in the processing elements.

In some embodiments, in the memory mode of operation, the memory associated with a processing element stores at least one of: feature data, kernel data, or partial sum data associated with a convolutional operation.

In some embodiments, a system includes a host device; and a hardware accelerator. The hardware accelerator includes a plurality of processing elements, each processing element having memory associated with the processing element; a stream switch; a plurality of stream engines coupled to a plurality of functional circuits via the stream switch, wherein the plurality of stream engines, in operation, generate data streaming requests to stream data to and from functional circuits of the plurality of functional circuits; a first system bus interface coupled to the plurality of stream engines; a second system bus interface coupled to the plurality of processing elements; and mode control circuitry, which, in operation, sets respective modes of operation for the plurality of processing elements. The modes of operation include a compute mode of operation in which the processing element performs computing operations using the memory associated with the processing element; and a memory mode of operation in which the memory associated with the processing element performs memory operations, bypassing the stream switch, via the second system bus interface.

In some embodiments, the plurality of processing elements includes a plurality of processing circuits and a memory associated with the plurality of processing circuits.

In some embodiments, at least one processing element of the plurality of processing elements comprises one or more In-Memory Computing (IMC) elements.

In some embodiments, the plurality of processing elements form one or more clusters of processing elements, a cluster including a reconfigurable crossbar switch. The reconfigurable crossbar switch is coupled to the stream switch, and the reconfigurable crossbar switch, in operation, streams data to, from and between processing elements of the cluster. In some embodiments, the at least one of the one or more clusters comprises a reconfigurable memory network, wherein the memory network is coupled to memories of the plurality of processing elements, and the memory network, in operation, transfers data to, from, and between processing elements of the processing cluster. In some embodiments, the system includes configuration registers, which, in operation, store configuration information for configuring the memory network, the configuration information being based on modes of operation associated with individual processing elements of the plurality of processing elements.

In some embodiments, the system includes a broadcast network. The broadcast network is coupled to the stream switch, and the broadcast network, in operation, streams data from the stream switch to the processing elements.

In some embodiments, the mode control circuitry includes one or more configuration registers.

In some embodiments, the mode control circuitry includes respective configuration registers embedded in the processing elements.

In some embodiments, in the memory mode of operation, the memory associated with a processing element stores at least one of: feature data, kernel data, or partial sum data associated with a convolutional operation.

In some embodiments, a method includes streaming data between stream engines of a plurality of stream engines of a hardware accelerator and functional circuits of a plurality of functional circuits of the hardware accelerator via a stream switch, wherein the plurality of functional circuits includes at least one cluster including a plurality of processing elements; and setting respective modes of operation for the plurality of processing elements. The modes of operation include a compute mode of operation in which the processing element performs computing operations using memory associated with the processing element; and a memory mode of operation in which the memory associated with the processing element performs memory operations, bypassing the stream switch.

In some embodiments, the method includes streaming data to, from and between processing elements of the cluster via a reconfigurable crossbar switch, wherein the reconfigurable crossbar switch is coupled to the stream switch.

In some embodiments, the method includes transferring data to, from, and between processing elements of the cluster via a reconfigurable memory network, wherein the reconfigurable memory network is coupled to memories of the plurality of processing elements. In some embodiments, the method includes storing configuration information in configuration registers, wherein the configuration information operates to configure the memory network based on modes of operation associated with individual processing elements of the plurality of processing elements.

In some embodiments, the method includes storing at least one of: feature data, kernel data, or partial sum data associated with a convolutional operation in the memory associated with a processing unit operating in the memory mode of operation.

In some embodiments, a non-transitory computer-readable medium has contents which configure a stream switch to stream data between stream engines of a plurality of stream engines of a hardware accelerator and functional circuits of a plurality of functional circuits of the hardware accelerator, wherein the plurality of functional circuits includes at least one cluster including a plurality of processing elements; and set respective modes of operation for the plurality of processing elements. The modes of operation include a compute mode of operation in which the processing element performs computing operations using memory associated with the processing element; and a memory mode of operation in which the memory associated with the processing element performs memory operations, bypassing the stream switch.

In some embodiments, the contents configure a crossbar switch to stream data to, from and between processing elements of the cluster, wherein the crossbar switch is coupled to the stream switch.

In some embodiments, the contents configure a memory network to transfer data to, from, and between processing elements of the cluster. The memory network is coupled to memories of the plurality of processing elements. In some embodiments, the contents include configuration information the operates to configure the memory network based on modes of operation associated with individual processing elements of the plurality of processing elements.

In some embodiments, the contents configure a processing unit, in the memory mode of operation, to store at least one of: feature data, kernel data, or partial sum data associated with a convolutional operation.

Some embodiments may take the form of or comprise computer program products. For example, according to one embodiment there is provided a computer readable medium comprising a computer program or other computer-executable instructions adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hardware accelerator, comprising:

a processing cluster including a crossbar switch interconnecting a plurality of processing elements within the processing cluster, each processing element of the interconnected processing elements having a respective internal memory within the processing element, the processing cluster coupled to a stream switch;

the stream switch;

a plurality of stream engines coupled to a plurality of functional circuits via the stream switch, wherein the plurality of stream engines, in operation, generate data streaming requests to stream data to and from functional circuits of the plurality of functional circuits;

a first system bus interface coupled to the plurality of stream engines;

a second system bus interface coupled to each processing element of the interconnected processing elements, independent from the stream switch and the crossbar switch; and mode control circuitry, which, in operation, sets respective modes of operation for individual processing elements of the interconnected processing elements of the processing cluster, wherein the modes of operation for an individual processing element include:

a compute mode of operation in which the processing element performs computing operations using the respective internal memory within the processing element; and a memory mode of operation in which the respective internal memory within the processing element performs memory operations, bypassing the stream switch, via the second system bus interface.

2. The hardware accelerator of claim 1, wherein the plurality of processing elements includes a plurality of processing circuits and a memory associated with the plurality of processing circuits.

3. The hardware accelerator of claim 1, wherein at least one processing element of the plurality of processing elements comprises one or more In-Memory Computing (IMC) elements.

4. The hardware accelerator of claim 1, wherein the plurality of processing elements form one or more clusters of processing elements, a cluster including a reconfigurable crossbar switch, wherein the reconfigurable crossbar switch is coupled to the stream switch, and the reconfigurable crossbar switch, in operation, streams data to, from and between processing elements of the cluster.

5. The hardware accelerator of claim 4, wherein the at least one of the one or more clusters comprises a reconfigurable memory network, wherein the memory network is coupled to memories of the plurality of processing elements, and the memory network, in operation, transfers data to, from, and between processing elements of the processing cluster.

6. The hardware accelerator of claim 5, comprising:

configuration registers, which, in operation, store configuration information for configuring the memory network, the configuration information being based on modes of operation associated with individual processing elements of the plurality of processing elements.

7. The hardware accelerator of claim 1, comprising:

a broadcast network, wherein the broadcast network is coupled to the stream switch, and the broadcast network, in operation, streams data from the stream switch to the processing elements.

8. The hardware accelerator of claim 1, wherein the mode control circuitry comprises one or more configuration registers.

9. The hardware accelerator of claim 1, wherein the mode control circuitry comprises respective configuration registers embedded in the processing elements.

10. The hardware accelerator of claim 1, wherein, in the memory mode of operation, the respective internal memory within the processing element stores at least one of: feature data, kernel data, or partial sum data associated with a convolutional operation.

11. A system, comprising:

a host device; and a hardware accelerator, the hardware accelerator including:

a processing cluster including a crossbar switch interconnecting a plurality of processing elements within the processing cluster, each processing element of the interconnected processing elements having a respective internal memory within the processing element, the processing cluster coupled to a stream switch;

the stream switch;

a plurality of stream engines coupled to a plurality of functional circuits via the stream switch, wherein the plurality of stream engines, in operation, generate data streaming requests to stream data to and from functional circuits of the plurality of functional circuits;

a first system bus interface coupled to the plurality of stream engines;

a second system bus interface coupled to each processing element of the interconnected processing elements, independent from the stream switch and the crossbar switch; and mode control circuitry, which, in operation, sets respective modes of operation for individual processing elements of the interconnected processing elements, wherein the modes of operation for an individual processing element include:

a compute mode of operation in which the processing element performs computing operations using the respective internal memory within the processing element; and a memory mode of operation in which the respective internal memory within the processing element performs memory operations, bypassing the stream switch, via the second system bus interface.

12. The system of claim 11, wherein the plurality of processing elements includes a plurality of processing circuits and a memory associated with the plurality of processing circuits.

13. The system of claim 11, wherein at least one processing element of the plurality of processing elements comprises one or more In-Memory Computing (IMC) elements.

14. The system of claim 11, wherein the plurality of processing elements form one or more clusters of processing elements, a cluster including a reconfigurable crossbar switch, wherein the reconfigurable crossbar switch is coupled to the stream switch, and the reconfigurable crossbar switch, in operation, streams data to, from and between processing elements of the cluster.

15. The system of claim 14, wherein the at least one of the one or more clusters comprises a reconfigurable memory network, wherein the memory network is coupled to memories of the plurality of processing elements, and the memory network, in operation, transfers data to, from, and between processing elements of the processing cluster.

16. The system of claim 15, comprising:

configuration registers, which, in operation, store configuration information for configuring the memory network, the configuration information being based on modes of operation associated with individual processing elements of the plurality of processing elements.

17. The system of claim 11, comprising:

a broadcast network, wherein the broadcast network is coupled to the stream switch, and the broadcast network, in operation, streams data from the stream switch to the processing elements.

18. The system of claim 11, wherein the mode control circuitry comprises one or more configuration registers.

19. The system of claim 11, wherein the mode control circuitry comprises respective configuration registers embedded in the processing elements.

20. The system of claim 11, wherein, in the memory mode of operation, the respective internal memory within the processing element stores at least one of: feature data, kernel data, or partial sum data associated with a convolutional operation.

21. A method, comprising:

streaming data between stream engines of a plurality of stream engines of a hardware accelerator and functional circuits of a plurality of functional circuits of the hardware accelerator via a stream switch, wherein the plurality of functional circuits includes at least one cluster including a crossbar switch interconnecting a plurality of processing elements within the at least one cluster, wherein the at least one cluster is coupled to the stream switch, and wherein a dedicated system bus interface is coupled to each processing element of the plurality of processing elements, independent from the stream switch and the crossbar switch; and setting respective modes of operation for individual processing elements of the interconnected processing elements, wherein the modes of operation for an individual processing element include:

a compute mode of operation in which the processing element performs computing operations using a respective internal memory within the processing element; and a memory mode of operation in which the respective internal memory within the processing element performs memory operations, via the dedicated system bus interface that bypasses the stream switch.

22. The method of claim 21, comprising streaming data to, from and between processing elements of the cluster via a reconfigurable crossbar switch, wherein the reconfigurable crossbar switch is coupled to the stream switch.

23. The method of claim 21, comprising transferring data to, from, and between processing elements of the cluster via a reconfigurable memory network, wherein the reconfigurable memory network is coupled to memories of the plurality of processing elements.

24. The method of claim 23, comprising storing configuration information in configuration registers, wherein the configuration information operates to configure the memory network based on modes of operation associated with individual processing elements of the plurality of processing elements.

25. The method of claim 21, comprising storing at least one of: feature data, kernel data, or partial sum data associated with a convolutional operation in a respective internal memory within a processing unit operating in the memory mode of operation.

26. A non-transitory computer-readable medium comprising instructions which, when executed by a computer, cause the computer to:

configure a stream switch to stream data between stream engines of a plurality of stream engines of a hardware accelerator and functional circuits of a plurality of functional circuits of the hardware accelerator, wherein the plurality of functional circuits includes at least one cluster including a crossbar switch interconnecting a plurality of processing elements within the at least one cluster, wherein the at least one cluster is coupled to the stream switch, and wherein a dedicated system bus interface is coupled to each processing element of the plurality of processing elements, independent from the stream switch and the crossbar switch; and set respective modes of operation for individual processing elements of the interconnected processing elements, wherein the modes of operation for an individual processing element include:

a compute mode of operation in which the processing element performs computing operations using a respective internal memory within the processing element; and a memory mode of operation in which the respective internal memory within the processing element performs memory operations, via the dedicated system bus interface that the stream switch.

27. The non-transitory computer-readable medium of claim 26, wherein the contents configure a crossbar switch to stream data to, from and between processing elements of the cluster, wherein the crossbar switch is coupled to the stream switch.

28. The non-transitory computer-readable medium of claim 26, wherein the contents configure a memory network to transfer data to, from, and between processing elements of the cluster, wherein the memory network is coupled to memories of the plurality of processing elements.

29. The non-transitory computer-readable medium of claim 28, wherein the contents include configuration information the operates to configure the memory network based on modes of operation associated with individual processing elements of the plurality of processing elements.

30. The non-transitory computer-readable medium of claim 26, wherein the contents configure a processing unit, in the memory mode of operation, to store at least one of: feature data, kernel data, or partial sum data associated with a convolutional operation.

* * * * *